United States Patent
Ooi et al.

(10) Patent No.: US 7,711,270 B2
(45) Date of Patent: May 4, 2010

(54) OPTICAL NODE AND OPTICAL ADD/DROP MULTIPLEXER

(75) Inventors: Hiroki Ooi, Kawasaki (JP); Takafumi Terahara, Kawasaki (JP); Jens C. Rasmussen, Kawasaki (JP); Akira Miura, Kawasaki (JP); Akihiko Isomura, Kawasaki (JP); Yuichi Akiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 896 days.

(21) Appl. No.: 11/316,941

(22) Filed: Dec. 27, 2005

(65) Prior Publication Data
US 2006/0140625 A1   Jun. 29, 2006

(30) Foreign Application Priority Data
Dec. 28, 2004  (JP) ............................. 2004-382167

(51) Int. Cl.
*H04B 10/02* (2006.01)
*H04J 14/02* (2006.01)

(52) U.S. Cl. ........................................ 398/175; 398/82
(58) Field of Classification Search .................. 398/82, 398/83, 175–177
See application file for complete search history.

(56) References Cited

U.S. PATENT DOCUMENTS

| 6,134,036 | A | 10/2000 | Andreozzi et al. | |
|---|---|---|---|---|
| 6,226,111 | B1 | 5/2001 | Chang et al. | |
| 6,501,877 | B1 | 12/2002 | Weverka et al. | |
| 6,657,952 | B1 * | 12/2003 | Shiragaki et al. | 370/223 |
| 7,272,311 | B2 * | 9/2007 | Doh et al. | 398/48 |
| 7,280,758 | B2 * | 10/2007 | Doh et al. | 398/59 |
| 2002/0126350 | A1 * | 9/2002 | Sato et al. | 359/124 |
| 2002/0145782 | A1 * | 10/2002 | Strasser et al. | 359/127 |

FOREIGN PATENT DOCUMENTS

| JP | 11-508428 A | 7/1999 |
|---|---|---|
| JP | 2002271354 | 3/2001 |
| JP | 2001509977 | 7/2001 |
| JP | 2003-515187 A | 4/2003 |
| WO | 9825365 | 6/1998 |

OTHER PUBLICATIONS

Hiroyuki Kasai, et al., "Clear Understanding of SDH/SONET Transmission System," Chap. 4, *OHMSHA*, Apr. 25, 2001.
Noboru Yajima, et al., "Key WDM Transmission Systems for Metro-Networks Provided by Different Vendors," Fujitsu Flashwave 7500, *Optronics*, No. 248, pp. 158-161.
W. J. Tomlinson, Wavelength-Selective Switching—Architecture and Technology Overview, WC3, JDS Uniphase, *Optical Society of America*, 2004.
Notice of Rejection dated Oct. 13, 2009 received in corresponding Japanese Patent Application No. 2004-382167.

* cited by examiner

*Primary Examiner*—Dalzid Singh
(74) *Attorney, Agent, or Firm*—Hanify & King, P.C.

(57) ABSTRACT

The optical node connects N networks to each other (where N is an integer larger than one). Each of the N networks respectively includes a first transmission path and a second transmission path. The optical node includes a switching unit that connects the first transmission path of one network of the N networks to other (N–1) networks; a failure detector that detects failure in the first transmission path of the network; and a control unit that causes the switching unit to connect the second transmission path of the network to the other (N–1) networks when the failure is detected.

11 Claims, 22 Drawing Sheets

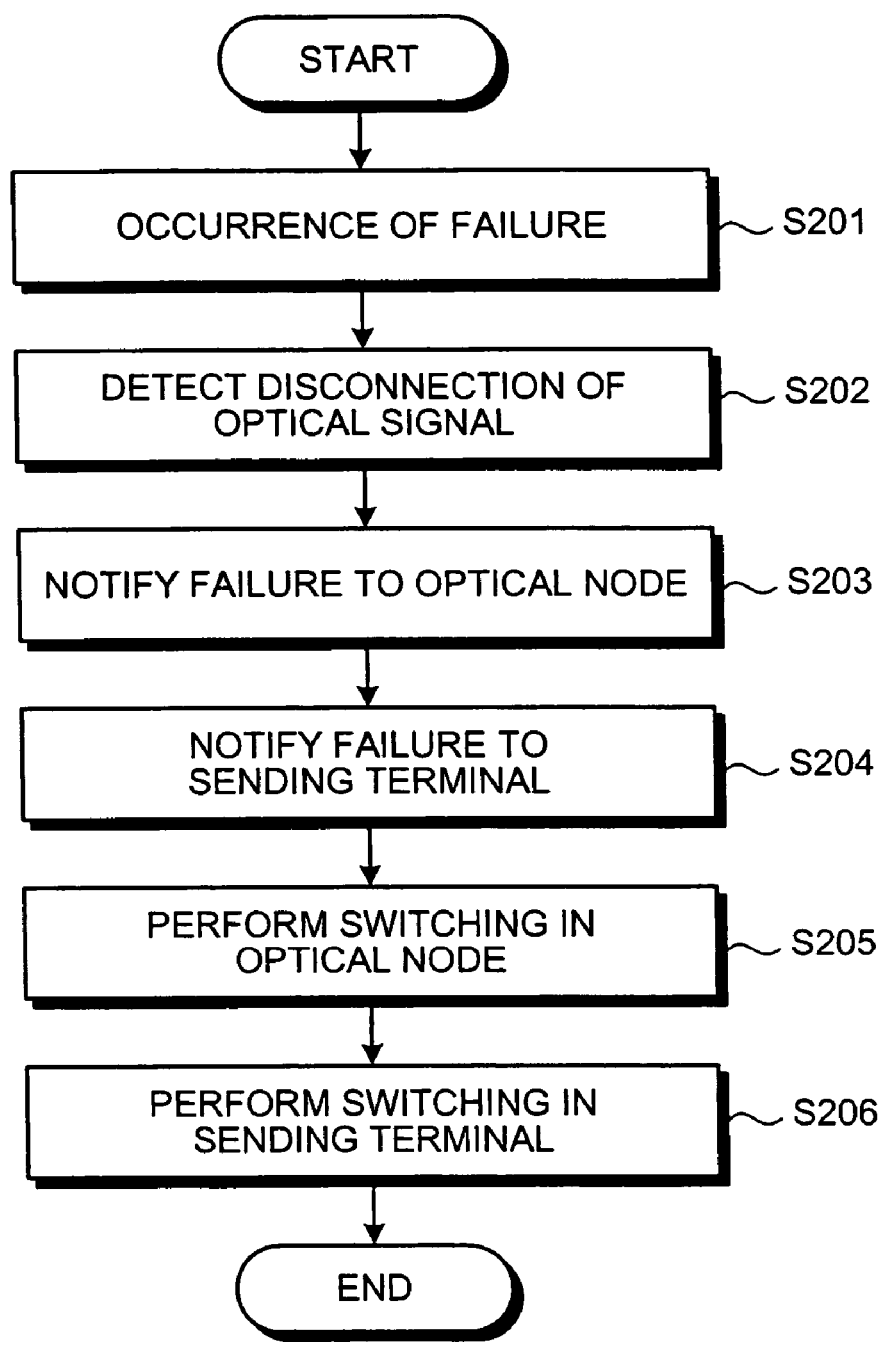

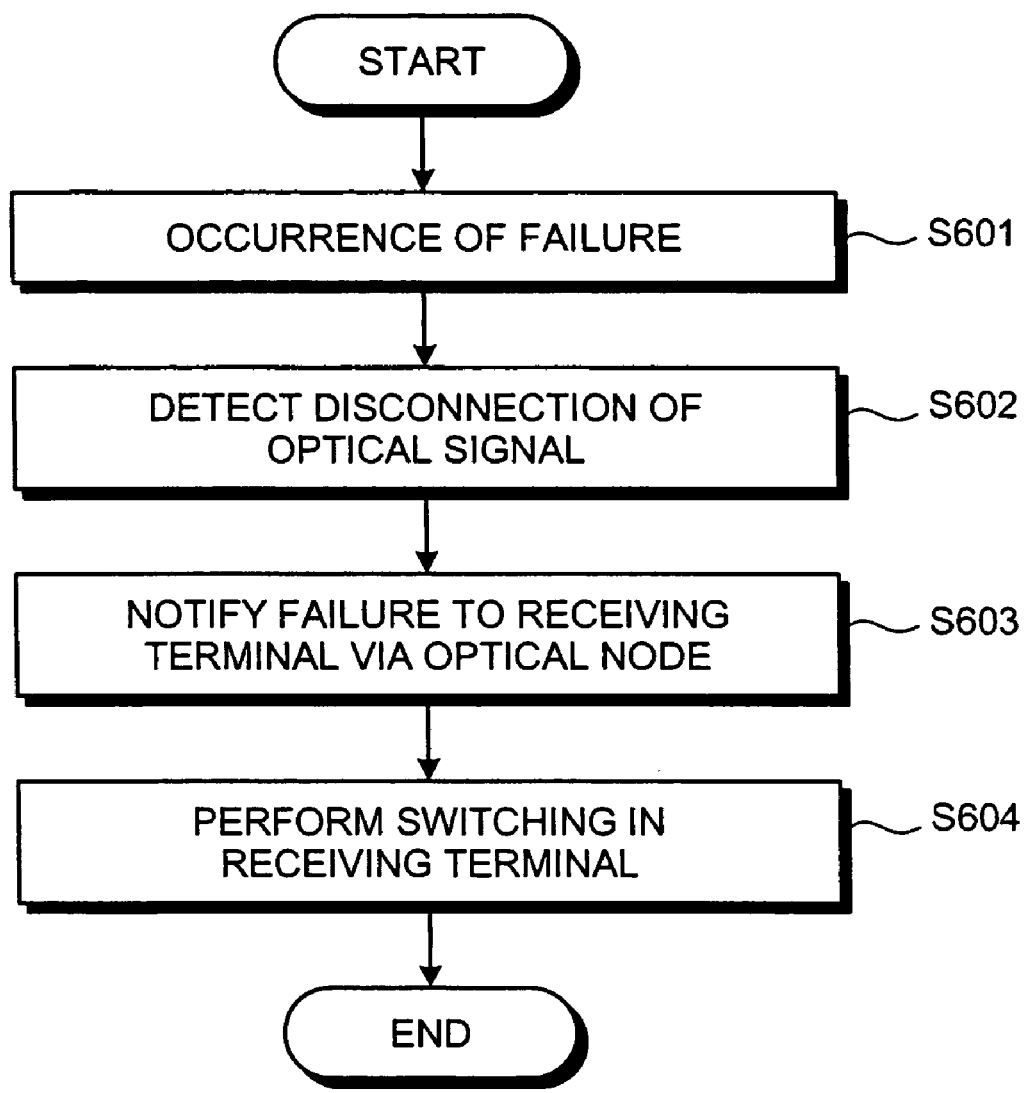

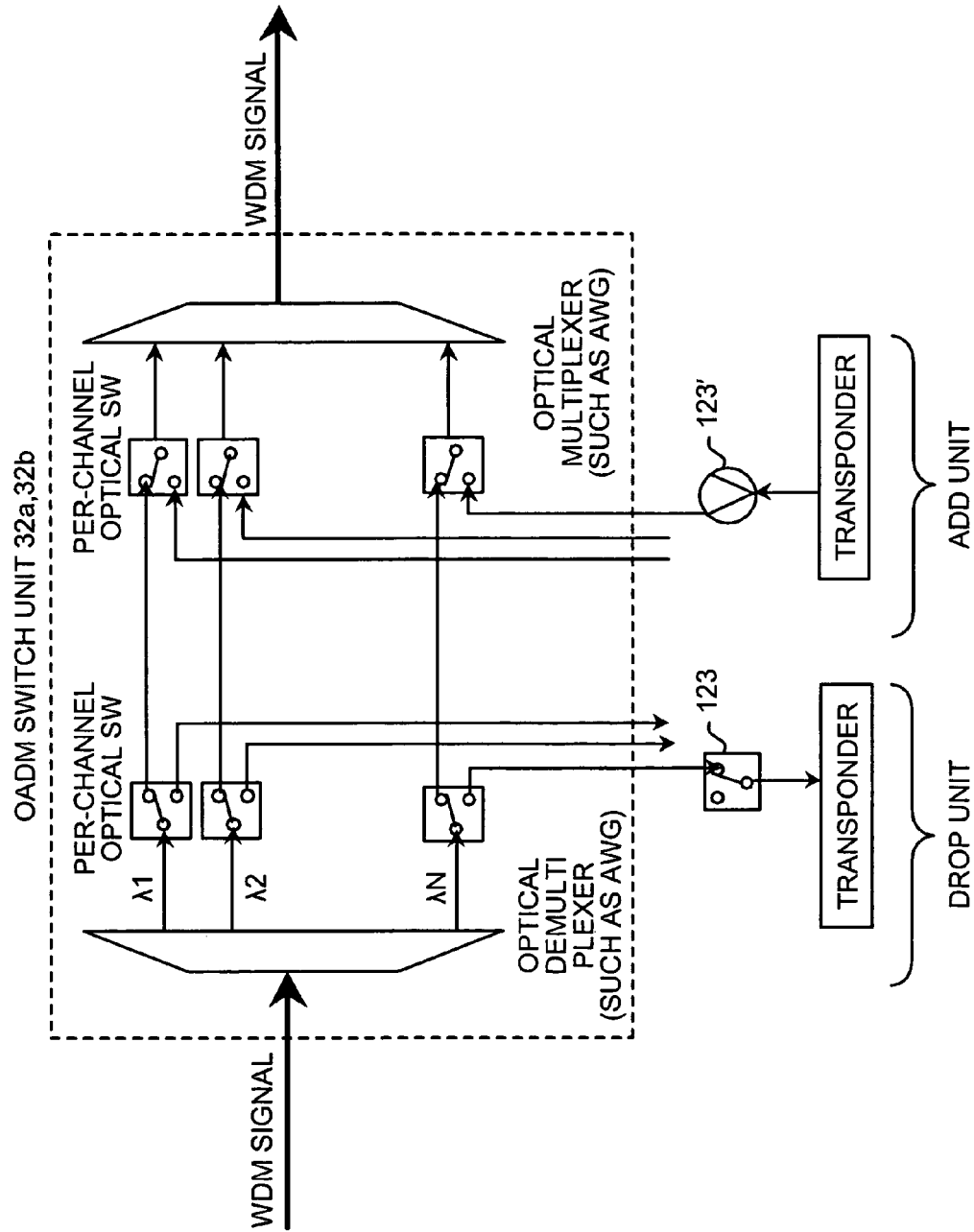

US 7,711,270 B2

OPTICAL NODE AND OPTICAL ADD/DROP MULTIPLEXER

CROSS-REFERENCE TO RELATED APPLICATIONS

This application is based upon and claims the benefit of priority from the prior Japanese Patent Application No. 2004-382167, filed on Dec. 28, 2004, the entire contents of which are incorporated herein by reference.

BACKGROUND OF THE INVENTION

1) Field of the Invention

The present invention relates to an optical node and an optical add/drop multiplexer for connecting a plurality of networks, which can transmit an optical signal as it is (without conversion to an electric signal) and can continue communication even when a failure occurs in the networks.

2) Description of the Related Art

It is required for a conventional metro-system to meet the demand for high reliability, and quickly recover from a failure such as optical fiber breaking. For example, the recovery must be performed within 50 milliseconds according to the Synchronous Optical NETwork/Synchronous Digital Hierarchy (SONET/SDH) standard, which is an international standard for a high-speed digital communication system. As an optical protection system, Optical Unidirectional Path Switched Ring (OUPSR) and Optical Shared Path Protection Ring (OSPPR) have been suggested and commonly used.

FIG. 9A is a diagram of a ring network E in the conventional OUPSR system. The ring network E has a redundant configuration. That is, the ring network E includes a working line 10, a protection line 20, and a plurality of optical add/drop multiplexer (OADM) nodes 30a to 30d.

Each of the OADM nodes 30a to 30d includes a transponder 31, an OADM switch unit 32a for the working line 10, an OADM switch unit 32b for the protection line 11, and a per-channel optical switch 33 (for example, see Published Japanese Translation of PCT international publication for patent application H11-508428). In a typical OUPSR system, a sending terminal includes an optical coupler 33', while a receiving terminal includes a per-channel optical switch 33.

For example, the optical coupler 33' of the OADM node 30a (sending terminal) branches and transmits an optical signal from the transponder 31 thereof to both of the working line 10 and the protection line 20 via the OADM switch units 32a and 32b. However, only the optical signal transmitted through the working line 10 is received by the transponder 31 of the OADM node 30c (receiving terminal), since the per-channel optical switch 33 thereof is basically connected to the OADM switch unit 32a for the working line 10.

FIG. 9B is a diagram of configurations of the conventional OADM switch units 32a and 32b, which includes an optical multiplexer/an optical demultiplexer, such as an arrayed waveguide (AWG), and per-channel optical switches. FIG. 9C is a diagram of configurations of the conventional OADM switch units 32a and 32b, which includes wavelength-selective switches (WSSs) whose development is advanced in recent years (for example, see W. J. Tomlinson, "Wavelength-selective switching architecture and technology overview", OFC 2004, WC3, Optical Society of America, February, 2004).

FIG. 9D is a diagram of a recovery operation from a failure in the OUPSR system. When a failure 11 occurs between the OADM nodes 30a and 30b, the per-channel optical switch 33 of the OADM node 30c (receiving terminal), which has been connected to the OADM switch unit 32a for the working line 10, is connected to the OADM switch unit 32b for the protection line 20. As a result, the optical signal transmitted from the OADM node 30a (sending terminal) via the protection line 20 is received by the transponder 31 of the OADM node 30c (receiving terminal) (for example, see Hiroyuki Kasai and other 3, "Easy understandable SDH/SONET transmission system", Version 1, Ohmsha, April, 2001, pages 110 to 118).

The OADM node 30c can detect the failure 11 by monitoring optical power level by a photodiode (PD) or the like in the transponder 31 thereof. The OADM node 30c can receive failure information, such as an alarm indication signal (AIS), via an optical supervisory channel (OSC) from an OADM node just after the occurrence point of the failure 11 (in FIG. 9D, the OADM node 30b) that is monitoring passing-through optical signals.

On the other hand, FIG. 10A is a diagram of a ring network F in the conventional OSPPR system. The ring network F includes a first working line 15 and a second working line 25, instead of the working line 10 and the protection line 11 shown in FIG. 10A. The first working line 15 is used for transmission of optical signals with the highest priority. Utilization efficiency can be improved by providing the two working lines 15 and 25.

Each of the OADM nodes 35a to 35d in the ring network F includes two transponders 36a and 36b, two OADM switch units 37a and 37b, and a per-channel optical switch 38. The transponder 36a and the OADM switch unit 37a are for the first working line 15, while the transponder 36b and the OADM switch unit 37b are for the second working line 25. The per-channel optical switch 38 switches between the first working line 15 and the second working line 25.

The transponder 36a of the OADM node 35a (sending terminal) transmits an optical signal to the OADM node 35c (receiving terminal) through the first working line 15. Simultaneously, the transponder 36b of the OADM node 35a can transmit an optical signal to the OADM node 35d (receiving terminal) through the second working line 25. Furthermore, the OADM node 35c (sending terminal) can transmit an optical signal to the OADM node 35d (receiving terminal) through the first working line 15 if it is not saturated.

FIG. 10B is a diagram of a recovery operation from a failure in the OSPPR system. When the failure 11 occurs between the OADM nodes 35a and 35b, the per-channel optical switch 38 of the OADM node 30c (receiving terminal), which has been connected to the OADM switch unit 37a for the first working line 15, is connected to the OADM switch unit 37b for the second working line 25. Similarly, the per-channel optical switch 38 of the OADM node 35a (sending terminal), which has been connected to the OADM switch unit 37a for the first working line 15, is connected to the OADM switch unit 37b for the second working line 25.

Thus, transmission is temporarily performed via the second working line 25 when a failure occurs. Communications with a low priority performed on the second working line 25 before the failure 11 is disconnected (for example, see Noboru Yajima and et. al. "Fujitsu FLASHWAVE 7500", OPTRONICS, Optronics Corp., August, 2002, pages 158 to 161).

The failure 11 is detected by the OADM node 35b just after the occurrence point of the failure 11. The OADM node 35b transmits the failure information, via the OSC of the first working line 15, to the OADM nodes 35c, 35d, and 35a in the order of the transmission direction.

On the other hand, FIG. 11 is a diagram of a plurality of ring networks in which an optical signal is converted to an electric signal. A node 45 between a ring networks G and H converts an optical signal transmitted over optical fibers 10 and 20 in the ring networks G and H to an electric signal. An electric switch 46 of the node 45 switches wavelength, route, and the like, based on the converted electric signal. The above configuration has various problems such that a transmission capacity is limited, cost and size of the node 45 is increased, a signal format is fixed, and so on. Therefore, it is required to connect a plurality of ring networks, each of which has the above protection function, by an optical signal.

FIGS. 12A and 12B are diagrams of functions of a WSS, FIG. 12C is a perspective view of the WSS, and FIGS. 12D and 12E are side views of the WSS. Such a WSS is disclosed in Published Japanese Translation of PCT international publication for patent application 2003-515187.

A WSS 1200 is a switch that can output a signal of an arbitrary wavelength in an input wavelength multiplexed signal to an arbitrary output port. The WSS 1200 includes 1 input port and N output ports as shown in FIG. 12A, or N input ports and 1 output port as shown in FIG. 12B.

As shown in FIG. 12C, the WSS 1200 includes a spectroscopic element 1201, an optical input and output port 1202, light-converging elements such as lens 1203, and a movable reflector array (a mirror array) 1204 for each wavelength. The spectroscopic element 1201, which is a diffraction grating, disperses wavelength division multiplexing (WDM) lights in different directions (along Z direction in FIG. 12C) for respective wavelengths. Lights along an angular dispersing direction spread in an X-Z plane. Correspondingly, a plurality of movable reflectors (MEMS mirrors) is provided in the movable reflector array 1204 along a dispersing direction (a lateral direction in FIG. 12C).

As shown in FIG. 12E, an incident light from the input port (IN) can be input to any one of the output ports (OUT) for each channel, by changing an angle of the movable reflector array 1204 along an arrangement direction (in Y direction in FIG. 12E) of the ports.

SUMMARY OF THE INVENTION

It is an object of the present invention to at least solve the problems in the conventional technology.

An optical node according to an aspect of the present invention connects N networks to each other (where N is an integer larger than one). Each of the N networks respectively includes a first transmission path and a second transmission path. The optical node includes a switching unit that connects the first transmission path of one network of the N networks to other (N−1) networks; a failure detector that detects failure in the first transmission path of the network; and a control unit that causes the switching unit to connect the second transmission path of the network to the other (N−1) networks when the failure is detected.

An optical node according to another aspect of the present invention connects N networks to each other (where N is an integer larger than one). Each of the N networks respectively includes a working line and a protection line. The optical node includes a first switching unit that connects the working lines of the N networks to each other; and a second switching unit that connects the protection lines of the N networks to each other.

An optical add/drop multiplexer according to still another aspect of the present invention is in a network that includes a plurality of transmission paths. The optical add/drop multiplexer includes a transponder that sends or receives an optical signal; a plurality of wavelength-selective switches that are respectively connected to the transmission paths; and a controller that connects the transponder to any one of the wavelength-selective switches via a per-channel optical switch or an optical coupler. The other objects, features, and advantages of the present invention are specifically set forth in or will become apparent from the following detailed description of the invention when read in conjunction with the accompanying drawings.

BRIEF DESCRIPTION OF THE DRAWINGS

FIG. 2 is a flowchart of switching processing performed by an optical switch unit of each optical add/drop multiplexer (OADM) node;

FIG. 6 is a flowchart of a switching processing performed by an optical switch of each OADM node;

FIG. 9B is a diagram of a configuration of a conventional OADM switch unit;

DETAILED DESCRIPTION

Exemplary embodiments according to the present invention will be explained below in detail with reference to the accompanying drawings.

Figure 1A:
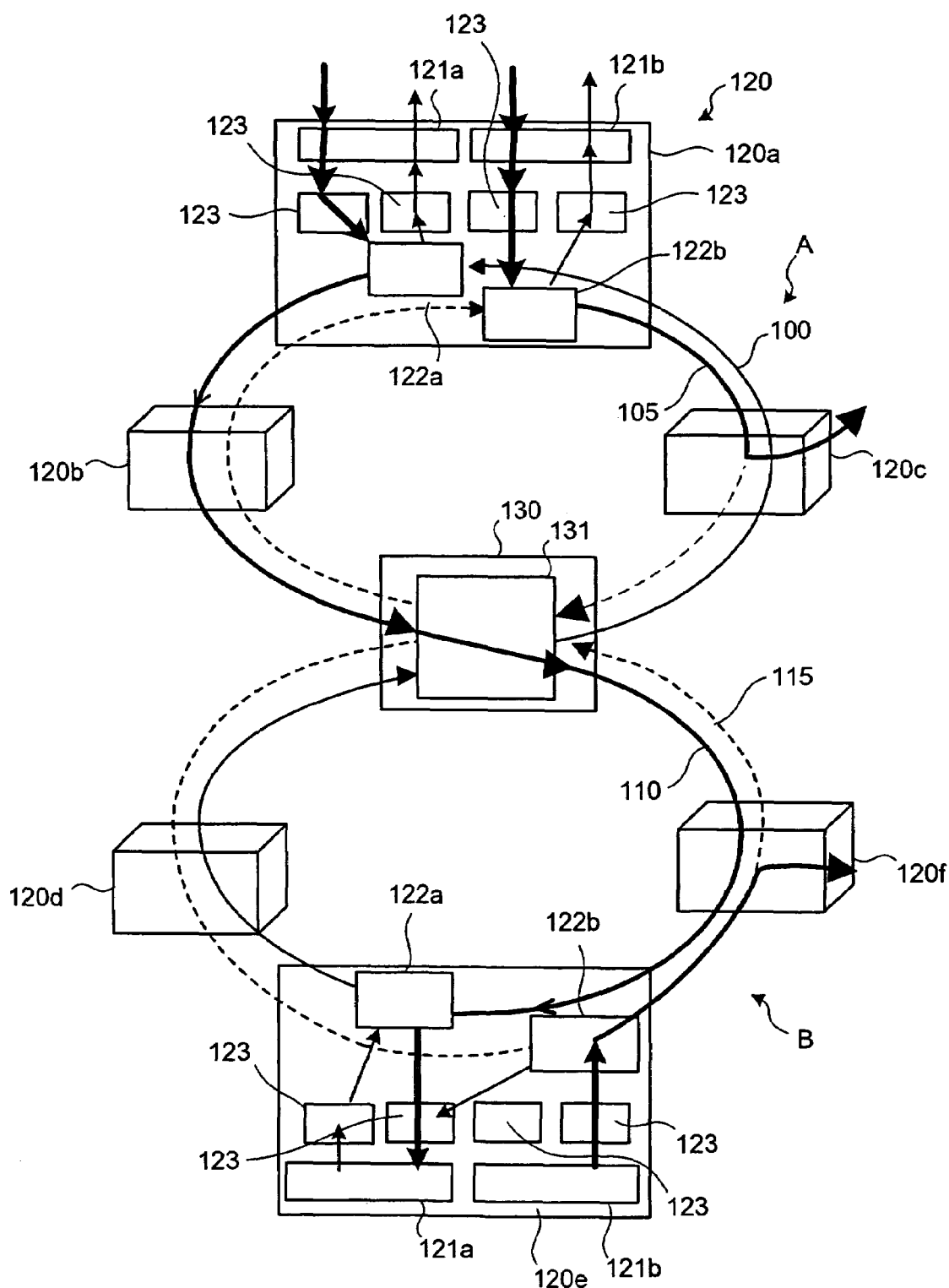
FIG. 1A is a diagram of a configuration of an optical network according to a first embodiment.

FIG. 1A is a diagram of a configuration of an optical network according to a first embodiment. In the first embodiment, a plurality of ring networks is connected by an optical node that performs switching in an optical level. The OSPPR system is used for recovery from a failure.

A ring network A includes a first working line 100, a second working line 105, and a plurality of OADM nodes 120a to 120c. A ring network B includes a first working line 110, a second working line 115, and a plurality of OADM nodes 120d to 120f.

The ring networks A and B are connected to each other by an optical node (a wavelength cross-connect node) 130. The optical node 130 includes an optical cross-connect switch unit (OXC SW) 131 with four input channels and four output channels (4×4). The first working lines 100 and 110 and the second working lines 105 and 115 have transmission directions opposed to each other. The first working lines 100 and 110 are used for transmitting an optical signal with the highest priority. The second working lines 105 and 115 are used for transmitting the other optical signals.

Each of the OADM nodes 120a to 120f includes an optical switch unit and a supervision/control unit. The supervision/control unit controls a recovery operation from a failure that has occurred in the ring network A or B. First, a configuration of the optical switch unit in each of the OADM nodes 120a to 120f will be explained.

Each of the OADM nodes 120a to 120f includes a transponder 121a for the first working line 100 or 110, a transponder 121b for the second working line 105 or 114, an OADM switch unit 122a for the first working line 100 or 110, an OADM switch unit 122b for the second working line 105 or 115, and per-channel optical switches 123 for switching the first working line 100 or 110 and the second working line 105 or 115. Each of the OADM nodes 120a to 120f also includes an optical power monitor (not shown) for failure detection in the supervision/control unit.

When the OADM node 120a in the ring network A (a sending terminal) transmits an optical signal to the OADM node 120e in the ring network B (a receiving terminal) via the first working lines 100 and 110, the optical signal from the transponder 121a of the OADM node 120a is transmitted to the OADM switch unit 122a for the first working line 100. The optical signal is transmitted to the first working line 110 in the ring network B via the OADM node 120b and the OXC SW 131 of the optical node 130.

The optical signal is further transmitted to the transponder 121a for the first working line 110 of the OADM node 120e via the OADM node 120f, the OADM switch unit 122a and the per-channel optical switch 123, since in an ordinary operation, the per-channel optical switch 123 is connected to the OADM switch unit 122a for the first working line 100 or 110.

Independently from the transmission of the optical signal described above, for example, an optical signal can be transmitted from the OADM node 120a to the OADM node 120c via the second working line 105 in the ring network A, or can be transmitted from the OADM node 120e to the OADM node 120f via the second working line 115 in the ring network B.

Figure 1B:
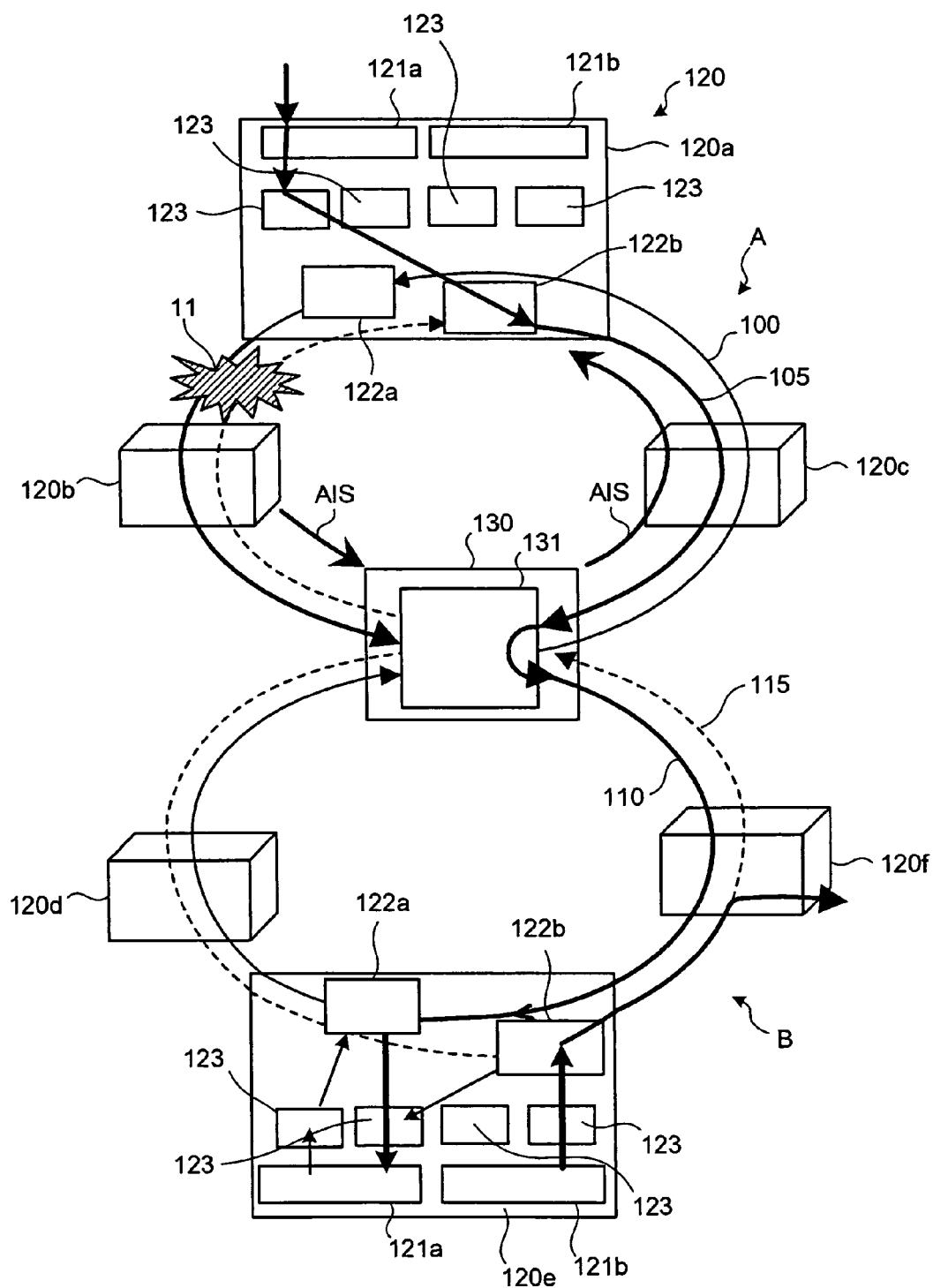
FIG. 1B is a diagram of a recovery operation from a failure according to the first embodiment.

FIG. 1B is a diagram of a recovery operation from a failure according to the first embodiment. FIG. 2 is a flowchart of switching processing performed by the optical switch unit of each OADM node. When a failure 11 occurs, as shown in FIG. 1B, between the OADM node 120a (sending terminal) and the OADM node 120b (Step S201), the optical power monitor of the OADM node 120b which is located just after the occurrence point of the failure 11 detects disconnection of an optical signal (Step S202).

The OADM node 120b notifies the failure 11 to the optical node 130 (Step S203). Specifically, The OADM node 120b transmits AIS indicating the disconnection to the optical node 130 through the optical supervisory channel (OSC) of the first working line 100. The OADM node 120b also transmits AIS to the OADM node 120a (sending terminal) via the first working line 100 to notify the failure 11 (Step S204).

The OXC SW 131 of the optical node 130, which has been notified of the failure 11, disconnects the first active line 100 of the ring network A from the first working line 110 of the ring network B, and connects the second working line 105 to the first working line 110 (Step S205). On the other hand, in the OADM node 120a (sending terminal), the per-channel optical switch 123 is connection-switched from the first working line 100 to the second working line 105 (Step S206). As a result of the above operation, the transponder 121a of the OADM node 120e (receiving terminal) can receive the optical signal from the transponder 121a of the OADM node 120a (sending terminal) even when a failure occurs.

Since an optical signal with the highest priority is transmitted via the first working lines 100 and 110, high-priority communication can be continued between the sending terminal and the receiving terminal even when a failure occurs. An optical signal with a low priority that is being transmitted via the second working line 105 is disconnected along with the switching processing by the OADM node 120a.

Figure 3A:
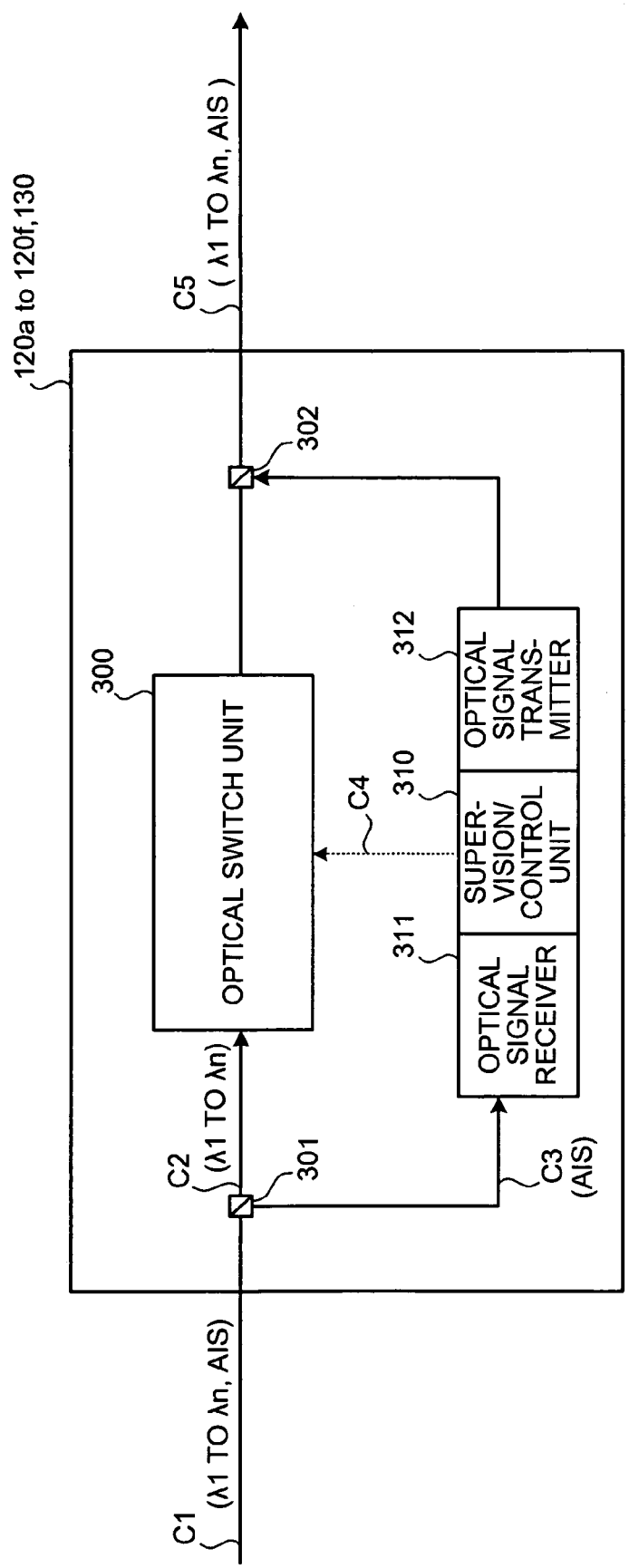
FIG. 3A is a block diagram of configurations of the OADM node and an optical node.

FIG. 3A is a block diagram of configurations of the OADM nodes 120a to 120f and the optical node 130. Each of the OADM nodes 120a to 120f and the optical node 130 includes an optical switch unit 300 and a supervision/control unit 310. A wavelength separating filter 301 and an optical signal receiver 311 are provided on a transmission path on an input side of the supervision/control unit 310. A wavelength coupling filter 302 and an optical signal transmitter 312 are provided on a transmission path on an output side of the supervision/control unit 310. In general, optical signals transmitted over a ring network include two elements: an optical signal (λ1 to λn) with a plurality of wavelengths flowing over a transmission signal channel, and an optical signal flowing over an optical supervisory channel (OSC) including AIS.

Figure 3B:
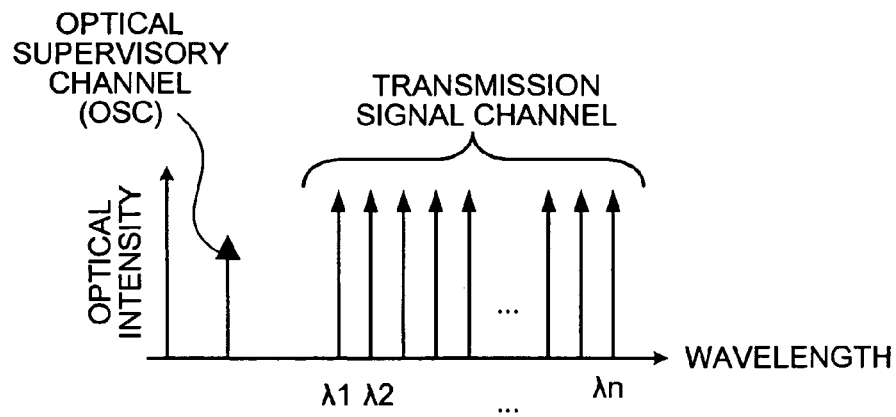
FIG. 3B is a graph of an optical signal input into the OADM node and the optical node.

FIG. 3B is a graph of an optical signal C1 input into the OADM nodes 120a to 120f and the optical node 130. The optical signal C1 is separated by the wavelength separating filter 301 into an optical signal C2 (λ1 to λn) on the transmission signal channel and an optical signal C3 on the OSC.

Figure 3C:
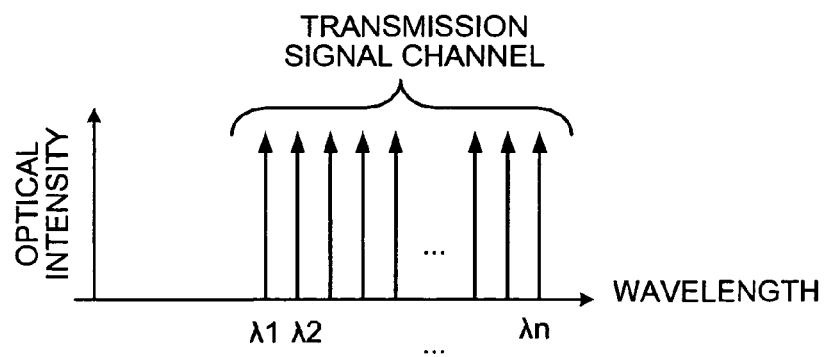
FIG. 3C is a graph of an optical signal input into the optical switch unit.

FIG. 3C is a graph of the optical signal C2 (λ1 to λn) input into the optical switch unit 300. The optical signal C2 (λ1 to λn) is subjected to various optical cross-connect processing such as Thru (through), Add and Drop.

The optical switch unit 300 includes a plurality of wavelength-selective switches (WSS) described later. An output port of each of input-side WSSs is thru-connected or cross-connected, under control of the supervision/control unit 310, to an input port of any one of output-side WSSs. Thus, the first working line 100 in the ring network A can be connected to both of the first working line 110 and the second working line 115 in the ring network B. The second working line 105 in the ring network A can be connected to both of the first working line 110 and the second working line 115 in the ring network B.

Figure 3D:
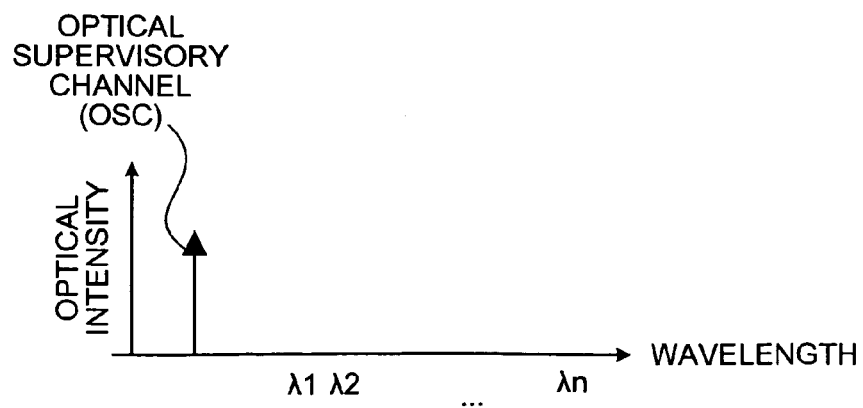
FIG. 3D is a graph of an optical signal input into a supervision/control unit.

FIG. 3D is a graph of the optical signal C3 input into the supervision/control unit 310. The optical signal C3 on the OSC separated by the wavelength separating filter 301 is input into the optical signal receiver 311, and after converted to an electric signal, input into the supervision/control unit 310. The supervision/control unit 310 outputs a control signal C4 to the optical switch unit 300 based upon the received signal. On the other hand, the optical signal transmitter 312 converts the electric signal from the supervision/control unit 310 into an optical signal again to transmit it to another node positioned downstream thereof. The optical signal C3 from the optical signal transmitter 312 is coupled with the optical signal C2 (λ1 to λn) from the optical switch unit 300 by the wavelength coupling filter 302, and the coupled signal is outputted to a transmission path as an optical signal C5.

Figure 4A:
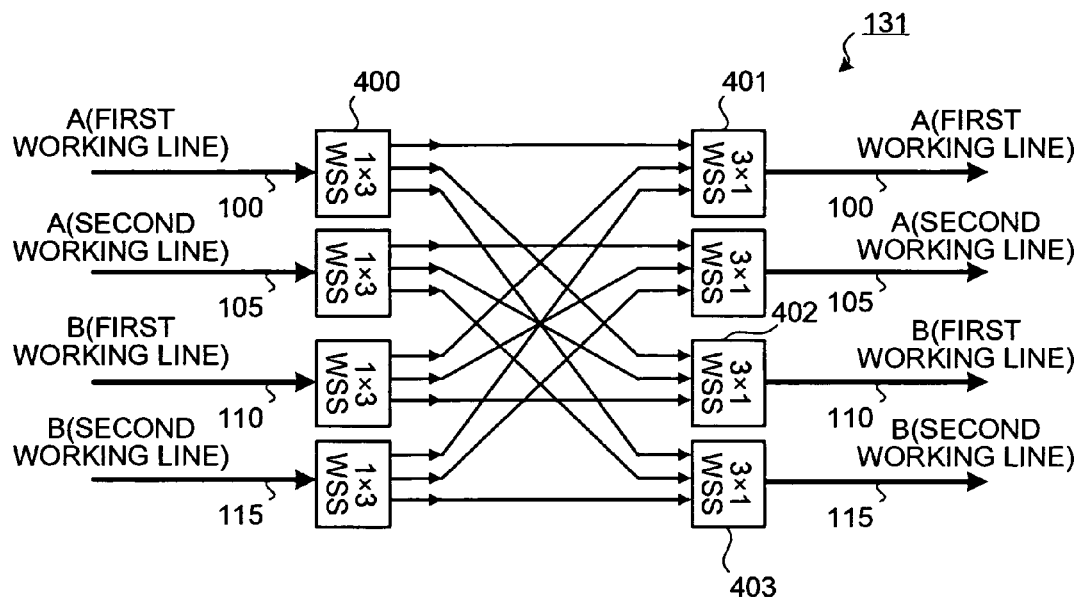
FIG. 4A is a diagram of a configuration of an optical cross-connect switch (OXC SW) of the optical node.

FIG. 4A is a diagram of a configuration of the OXC SW 131 of the optical node 130 (see FIG. 1A) connecting two ring networks A and B. The OXC SW 131 includes 4 input-side WSSs (1×3) and 4 output-side WSSs (3×1).

For example, a WSS 400 connected to the first working line 100 in the ring network A has three output ports. The first output port is thru-connected to an input port of a WSS 401, which is similarly connected to the first working line 100 in the ring network A. The second output port is cross-connected to a WSS 402 on the first working line 110 in the ring network B. The third output port is cross-connected to a WSS 403 on the second working line 115 in the ring network B. Similarly, each of the other WSSs is connected to the same line in the same network or either one of the two lines in another ring network.

Figure 4B:
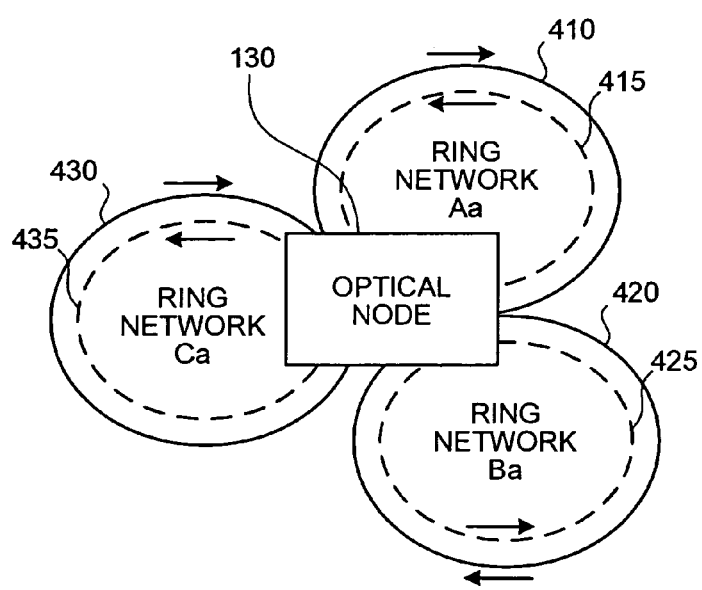
FIG. 4B is a diagram of the optical node connecting three ring networks.
Figure 4C:
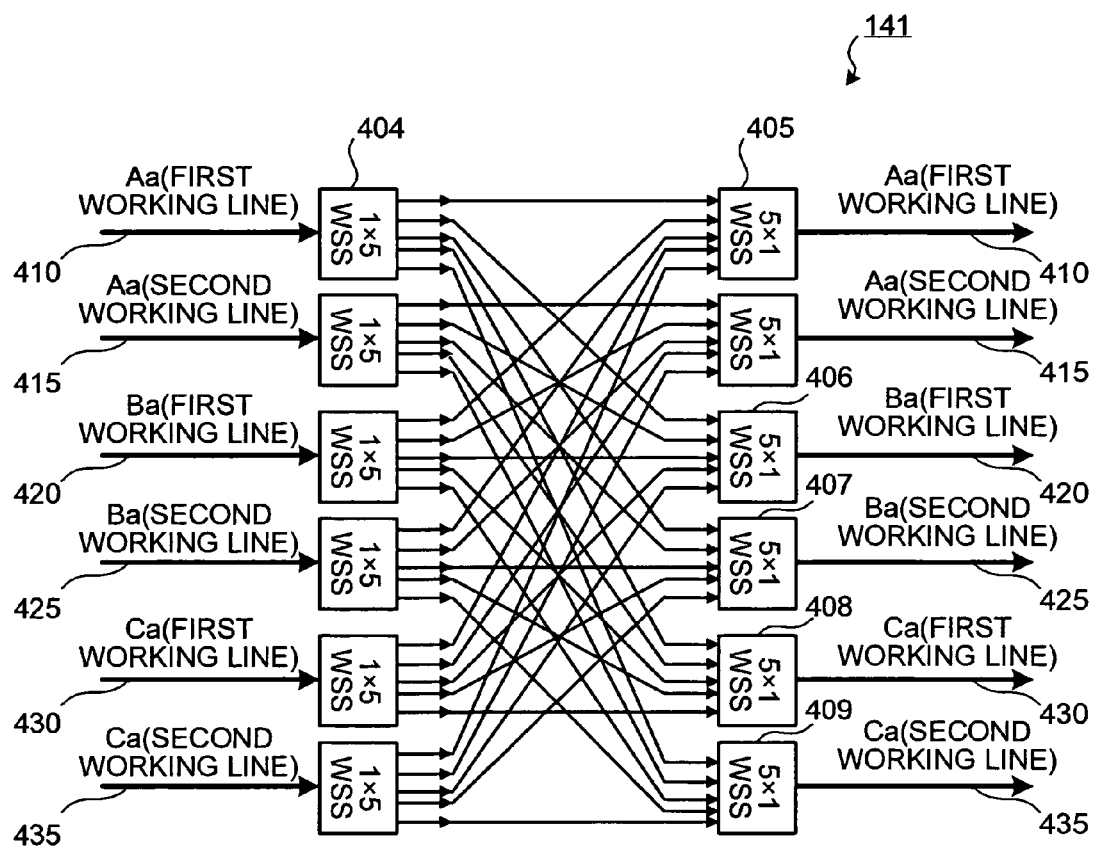
FIG. 4C is a diagram of a configuration of the OXC SW of the optical node connecting three ring networks.

FIG. 4B is a diagram of the optical node 130 connecting three ring networks Aa, Ba, and Ca. FIG. 4C is a diagram of a configuration of the OXC SW 141 thereof.

A first working line 410 and a second working line 415 in the ring network Aa, a first working line 420 and a second working line 425 in the ring network Ba, and a first working line 430 and a second working line 435 in the ring network Ca are connected by the 6×6 OXC SW 141. The 6×6 OXC SW 141 includes 6 input-side WSSs (1×5) and 6 output-side WSSs (5×1).

For example, a WSS 404 connected to the first working line 410 in the ring network Aa has 5 output ports. The first output port is thru-connected to an input port of a WSS 405 connected to the first working line 410 in the ring network Aa. The second output port is cross-connected to a WSS 406 on the first working line 420 in the ring network Ba. The third output port is cross-connected to a WSS 407 on the second working line 425 in the ring network Ba. The fourth output port is cross-connected to a WSS 408 on the first working line 430 in the ring network Ca. The fifth output port is cross-connected to a WSS 409 on the second working line 435 in the ring network Ca. Similarly, each of the other WSSs is connected to the same line in the same ring network, or either one of two lines in other ring networks.

As shown in FIGS. 4A and 4C, the optical node 130 connecting N ring networks includes OXC SW 131/141 with 2N input-side WSSs and 2N output-side WSSs, each of which can perform a high-speed switching operation when a failure occurs. Each of the input-side WSSs includes 1 input port and (2N−1) output ports (1×(2N−1)). Each of the output-side WSSs includes (2N−1) input ports and 1 output port ((2N−1)×1). Even if the number of networks to be connected to the optical node 130 is increased, the increase can be handled easily by only increasing the number of WSSs.

According to the first embodiment, when a failure has occurred in a working line in a network, the optical node 130 connects another working line in the network to another network/other networks, so as not to disconnect an optical signal with a higher priority. In another network/other networks, communication can be continued without changing working line before and after the failure. The utilization efficiency of the lines can be improved since two working lines can be used simultaneously in each network while any failure does not occur.

Figure 5A:
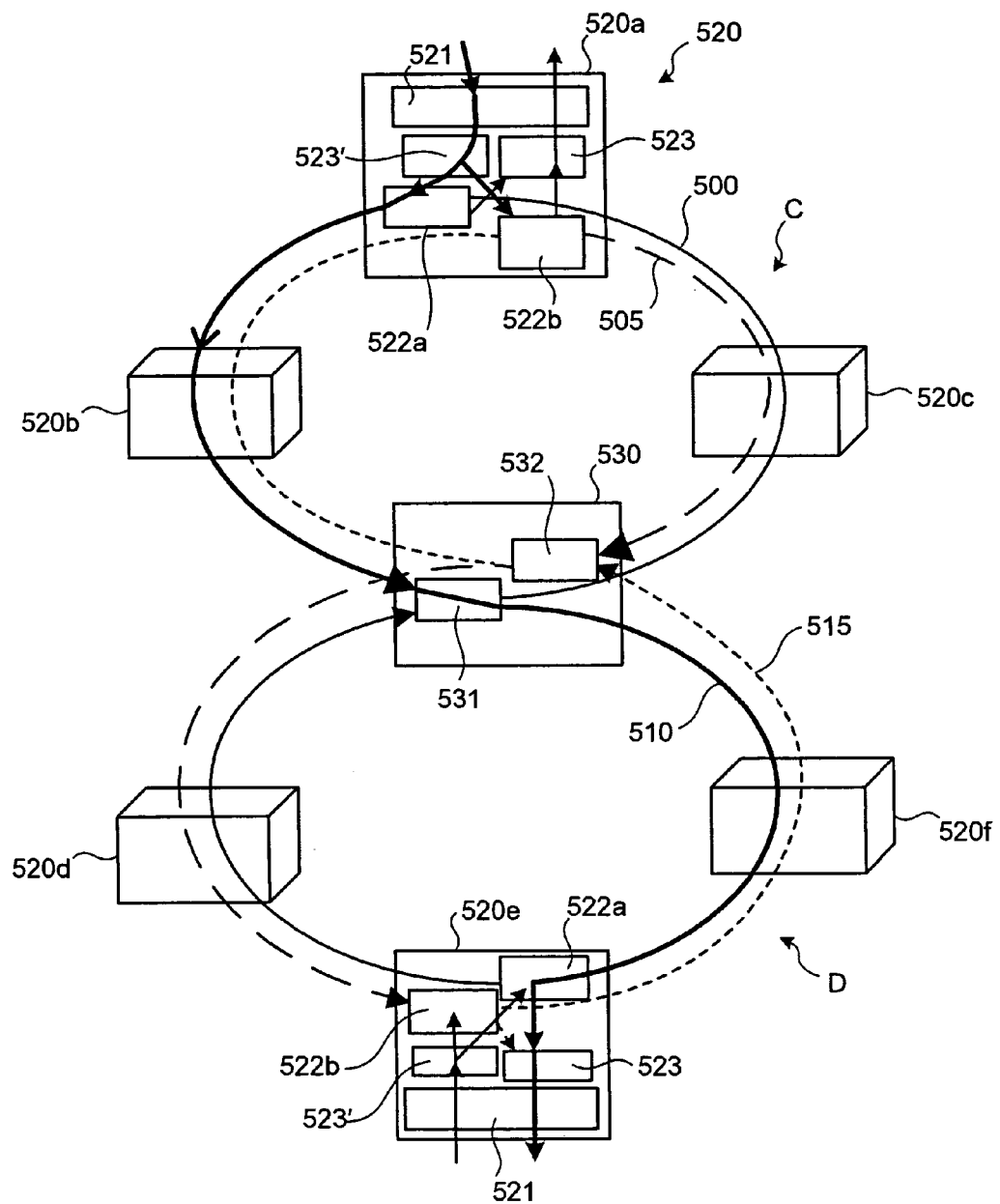
FIG. 5A is a diagram of a configuration of an optical network according to a second embodiment.

FIG. 5A is a diagram of a configuration of an optical network according to a second embodiment. In the second embodiment, a plurality of ring networks is connected by an optical node that performs switching in an optical level. The OUPSR system is used for recovery from a failure.

A ring network C includes a working line 500, a protection line 505, and a plurality of OADM nodes 520a to 520c. A ring network D includes a working line 510, a protection line 515, and a plurality of OADM nodes 520d to 520f. The ring networks C and D are connected to each other by an optical node 530. The optical node 530 includes an OXC SW 531 that connects the working line 500 and the working line 510, and an OXC SW 532 that connects the protection line 505 and the protection line 515.

Each of the OADM nodes 520a to 520f includes an optical switch unit and a supervision/control unit (not shown). The supervisory/control unit controls a recovery operation from a failure that has occurred in the ring network C or D. The configuration of the supervisory/control unit is the same as that explained with reference to FIGS. 3A to 3D.

Each of the OADM nodes 520a to 520f includes a transponder 521, an OADM switch unit 522a for a working line, an OADM switch unit 522b for a protection line, an optical coupler 523', and a per-channel optical switch 523 for switching the line to receive an optical signal. Each of the OADM nodes 520a to 520f also includes an optical power monitor (not shown) for failure detection.

When the OADM node 520a in the ring network C (sending terminal) transmits an optical signal to the OADM node 520e in the ring network D (receiving terminal) via the working lines 500 and 510, the optical signal from the transponder 521 of the OADM node 520a is transmitted to the OADM switch unit 522a for the working line via the optical coupler 523'. The optical signal is also branched by the optical coupler 523' to be simultaneously transmitted to the OADM switch unit 522b for the protection line. In other words, the optical signal flows into both the working line 500 and the protection line 505.

The optical signal is transmitted to the optical node 530 via the OADM node 520b on the working line 500, and to the working line 510 in the ring network D. The optical signal is further transmitted, via the OADM node 520f, to the OADM switch unit 522a, the per-channel optical switch 523, and then the transponder 521 of the OADM node 520e.

As described above, the optical signal is also transmitted to the protection line 505 via the OADM switch unit 522b of the OADM node 520a in the ring network C. The optical signal is transmitted to the protection line 515 in the ring network D via the optical node 530, and then transmitted to the OADM switch unit 522b for the protection line of the OADM node 520e (receiving terminal). However, the optical signal transmitted via the protection lines 505 and 515 is not received by the transponder 521 of the OADM node 520e, since during an ordinary operation, the per-channel optical switch 523 always connects the transponder 521 to the OADM switch unit 522a for the working line.

Figure 5B:
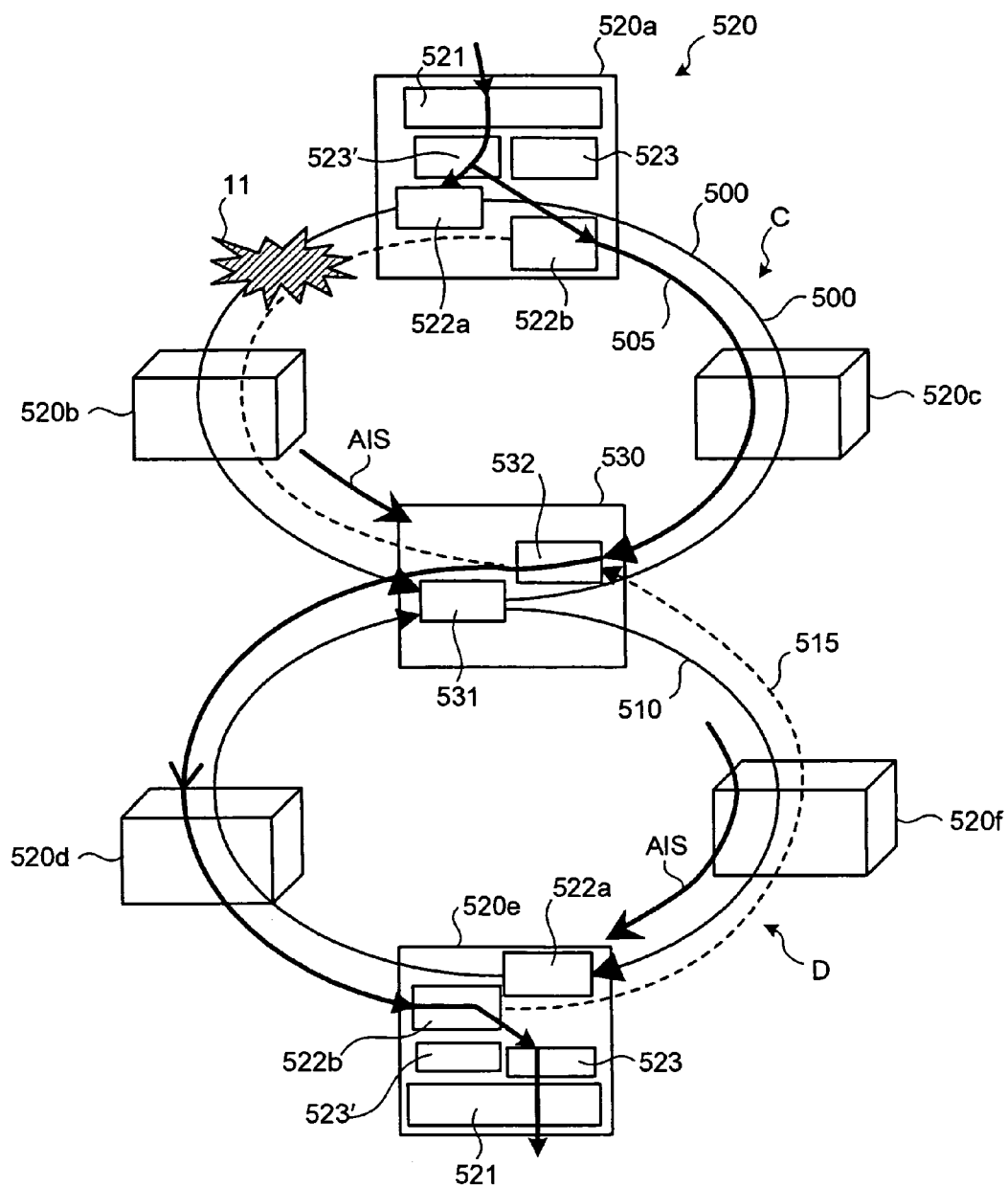
FIG. 5B is a diagram of a recovery operation from a failure according to the second embodiment.

FIG. 5B is a diagram of a recovery operation from a failure according to the second embodiment. FIG. 6 is a flowchart of a switching processing performed by the optical switch of each OADM node. When a failure 11 occurs, as shown in FIG. 5B, between the OADM node 520a (sending terminal) and the OADM node 520b (Step S601), the optical power monitor of the OADM node 520b which is located just after the occurrence point of the failure 11 detects disconnection of an optical signal (Step S602).

The OADM node 520b transmits AIS indicating the disconnection to the optical node 530 through the optical supervisory channel (OSC) of the working line 500. The OXC SW 531 of the optical node 530 transmits the AIS to the OADM node 520e (receiving terminal) in the ring network D via the working line 510 to notify the failure 11 (Step S603).

In the OADM node 520e (receiving terminal), which has been notified of the failure 11, the per-channel optical switch 523 is connection-switched from the working line 510 to the protection line 515 on which the same signal flows (Step S604). As a result of the operation described above, the transponder 521 of the OADM node 520e (receiving terminal) can receive the optical signal from the transponder 521 of the OADM node 520a (sending terminal) even when a failure occurs.

Figure 7A:
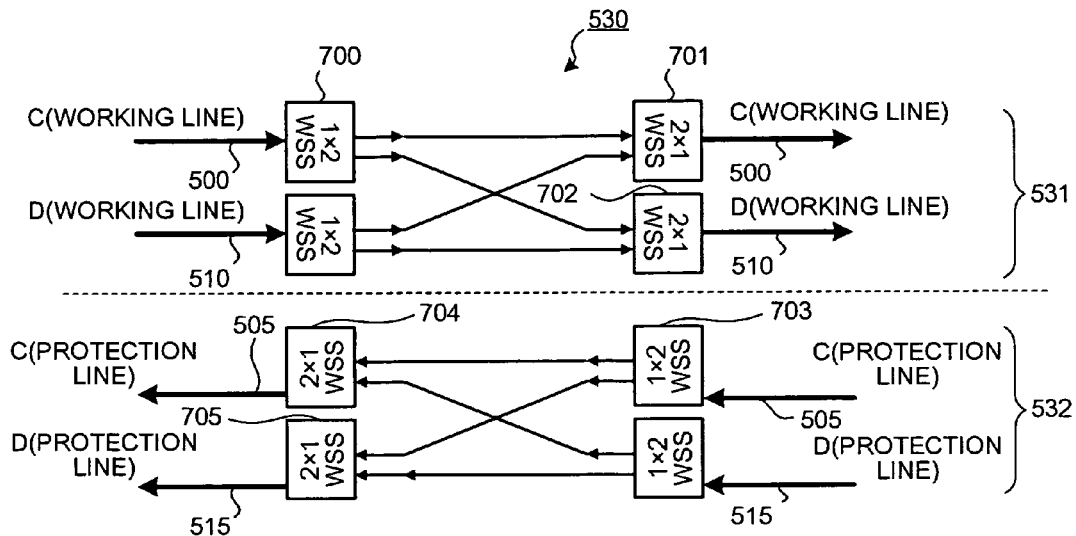
FIG. 7A is a diagram of configurations of OXC SWs of the optical node.

FIG. 7A is a diagram of configurations of the OXC SWs 531 and 532 of the optical node 530 (see FIG. 5A) connecting two ring networks C and D. The OXC SW 531 includes 2 input-side WSSs (1×2) and 2 output-side WSSs (2×1) for connecting the working line 500 in the ring network C and the working line 510 in the ring network D. The OXC SW 532 includes 2 input-side WSSs (1×2) and 2 output-side WSSs (2×1) for connecting the protection line 505 in the ring network C and the protection line 515 in the ring network D. Thus, in the optical node 530, the OXC SW 531 for the working lines is separated from the OXC SW 532 for the protection lines.

For example, a WSS 700 connected to the working line 500 in the ring network C has two output ports. One of the output ports is thru-connected to a WSS 701 on the working line 500 in the ring network C, and the other one of the output ports is cross-connected to a WSS 702 on the working line 510 in the ring network D. Similarly, one of the output ports of a WSS 703 is thru-connected to a WSS 704 on the same protection line (that is, the protection line 505 in the ring network C), and a the other one is cross-connected to a WSS 705 on a different protection line (that is, the protection line 515 in the ring network D). Similarly, each of the other WSS connects two working lines or two protection lines to each other.

Figure 7B:
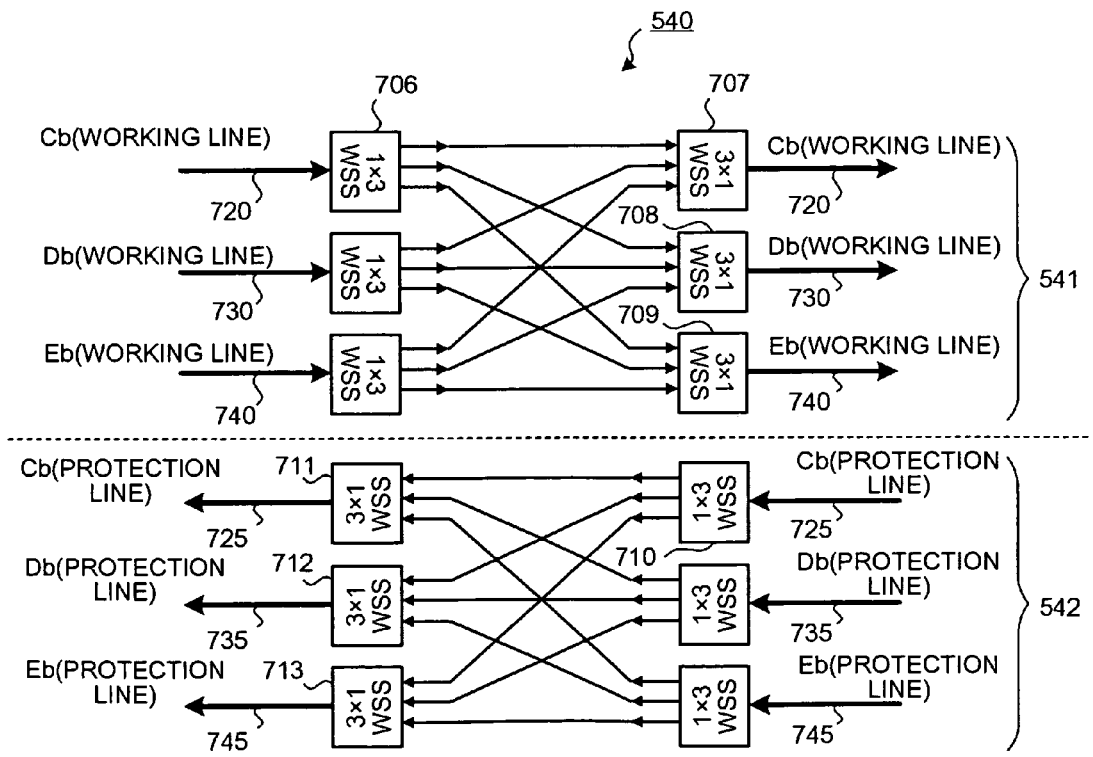
FIG. 7B is a diagram of configurations of OXC SWs in an optical node connecting three ring networks.

FIG. 7B is a diagram of configurations of OXC SWs 541 and 542 of an optical node 540 connecting three ring networks Cb, Db, and Eb. Even if the number of ring networks to be connected is increased to three, switching processing similar to that in two ring networks described above can be conducted by the OXC SWs 541 and 542 shown in FIG. 7B.

The OXC SW 541 for working lines includes 3 input-side WSSs (1×3) and 3 output-side WSSs (3×1) connecting a working line 720 in the ring network Cb, a working line 730 in the ring network Db, and a working line 740 in the ring network Eb. The OXC SW 542 for protection lines includes 3 input-side WSSs (1×3) and 3 output-side WSSs (3×1) connecting a protection line 725 in the ring network Cb, a protection line 735 in the ring network Db, and a protection line 745 in the ring network Eb.

For example, a WSS 706 connected to the working line 720 in the ring network Cb includes three output ports. The first output port is thru-connected to a WSS 707, which is similarly connected to the working line 720 in the ring network Cb. The second output port is cross-connected to a WSS 708 on the working line 730 in the ring network Db. The third output port is cross-connected to a WSS 709 on the working line 740 in the ring network Eb. Similarly, a WSS 710 connected to the protection line 725 in the ring network Cb has three output ports. The first output port is thru-connected to a WSS 711 on the protection line 725 in the ring network Cb. The second output port is cross-connected to a WSS 712 on the protection line 735 in the ring network Db. The third output port is cross-connected to a WSS 713 on the protection line 745 in the ring network Eb. Similarly, each of the other WSSs connects two working lines or two protection lines to each other.

As shown in FIGS. 7A and 7B, the WSSs for working lines are connected to only working lines, while that for protection lines are connected to only protection lines. In an optical node connecting N ring networks, each of the OXC SWs includes 2N input-side WSSs and 2N output-side WSSs. Each of the input-side WSSs includes 1 input port and N output ports (1×N). Each of the output-side WSSs includes N input ports and 1 output port (N×1). In the second embodiment, a WSS with a low-speed operation can be used since a switching operation is not performed when a failure occurs.

In the second embodiment, working lines and protection lines in a plurality of ring networks are respectively connected, so that a ring network constituted of the working lines and a ring network constituted of the protection lines can be configured among the ring networks. Even if a failure occurs in the working line, communication can be continued by the OADM node 520e (receiving terminal) switching from the working line to the protection line. Thereby, in the second embodiment using the OUPSR system, there are wider variety of options concerning to the WSS such as the number of input/output fibers and a response speed, than the first embodiment using the OSPPR system.

Figure 8:
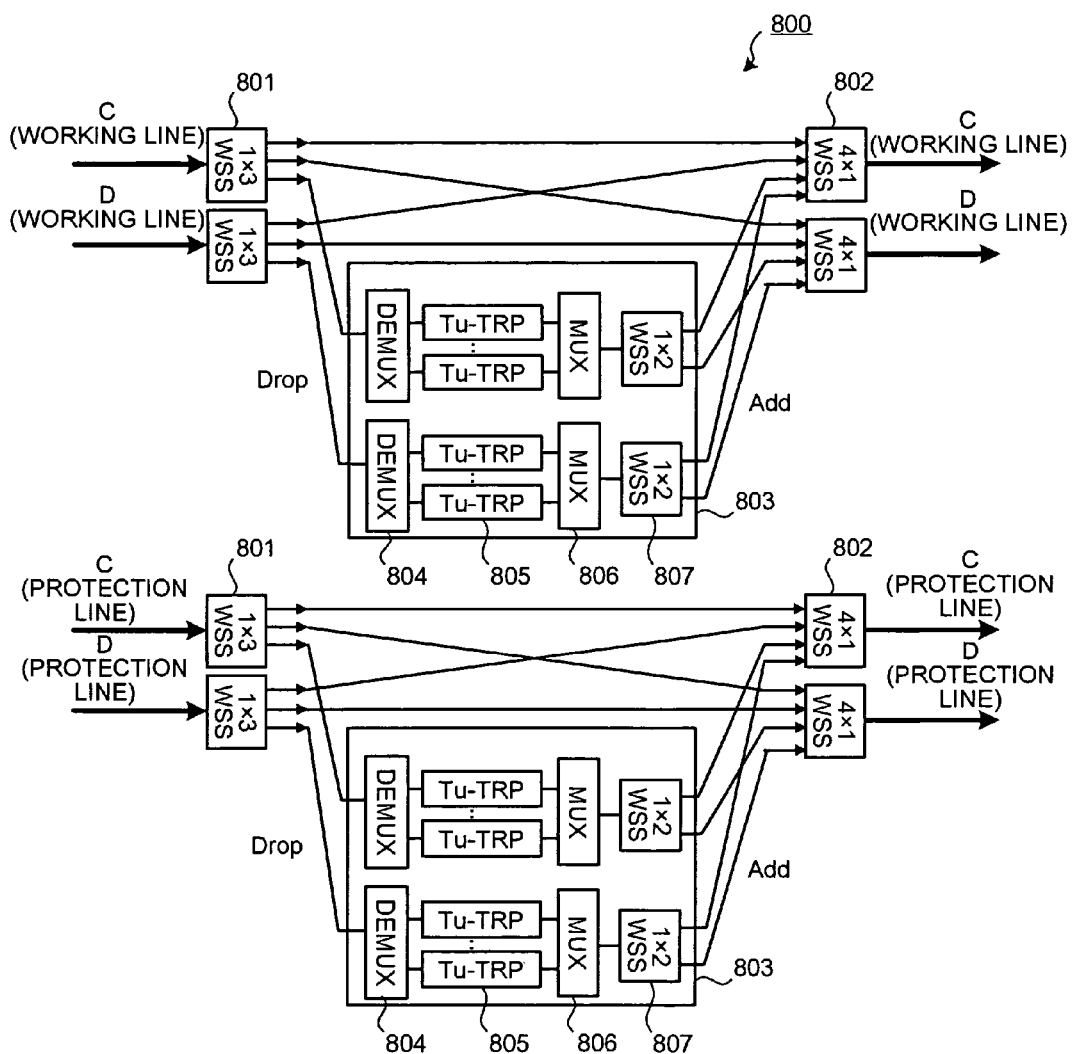
FIG. 8 is a diagram of an optical node with a wavelength-conversion function.
Figure 9A:
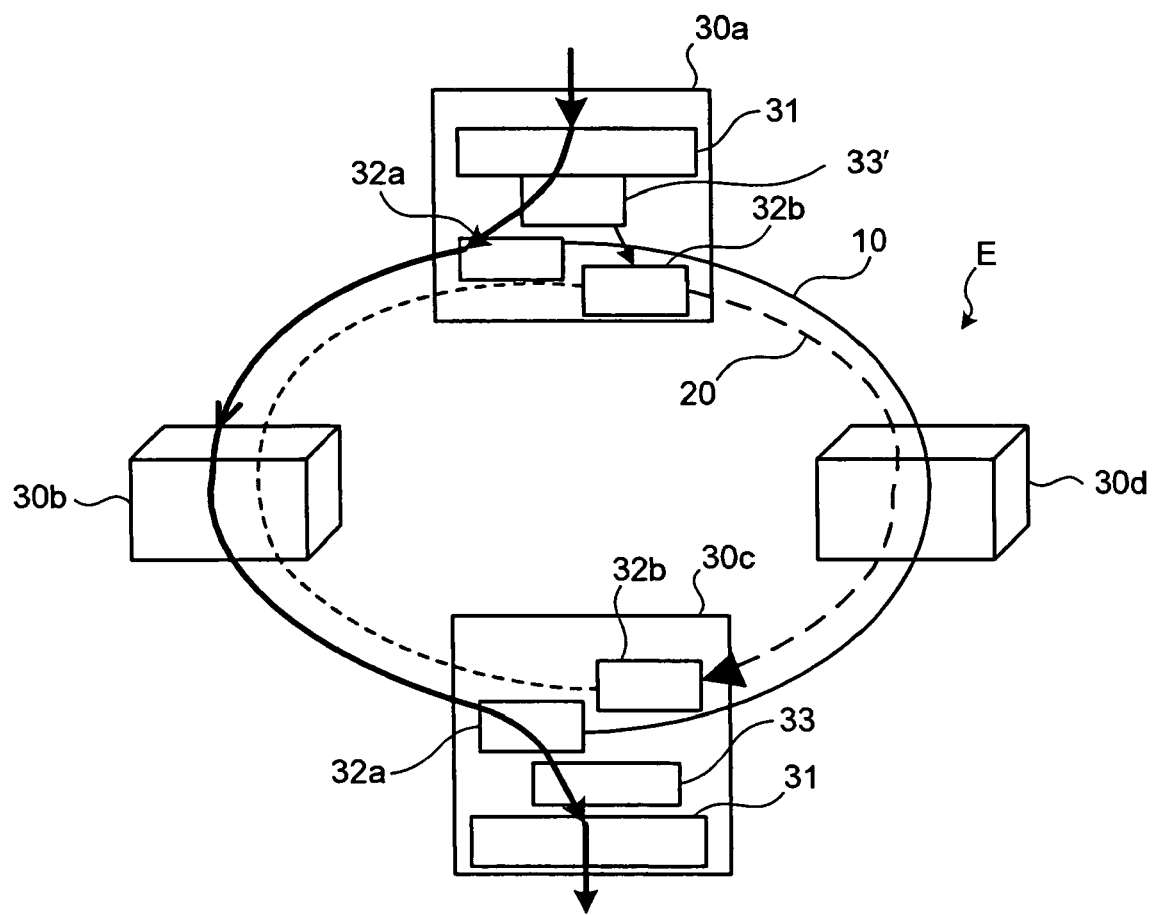
FIG. 9A is a diagram of a ring network in a conventional Optical Unidirectional Path Switched Ring (OUPSR) system.
Figure 9C:
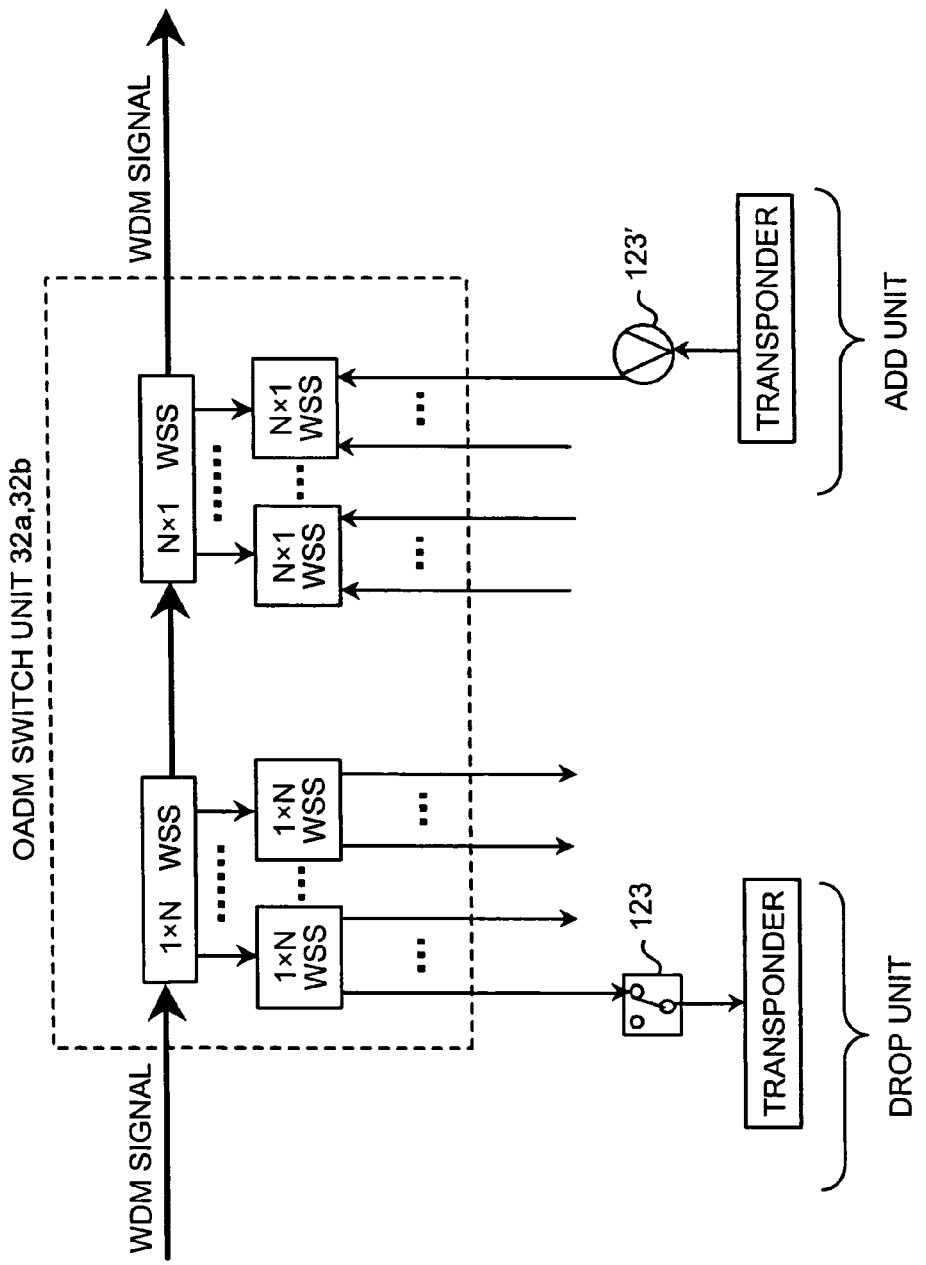
FIG. 9C is a diagram of another configuration of the conventional OADM switch unit.
Figure 9D:
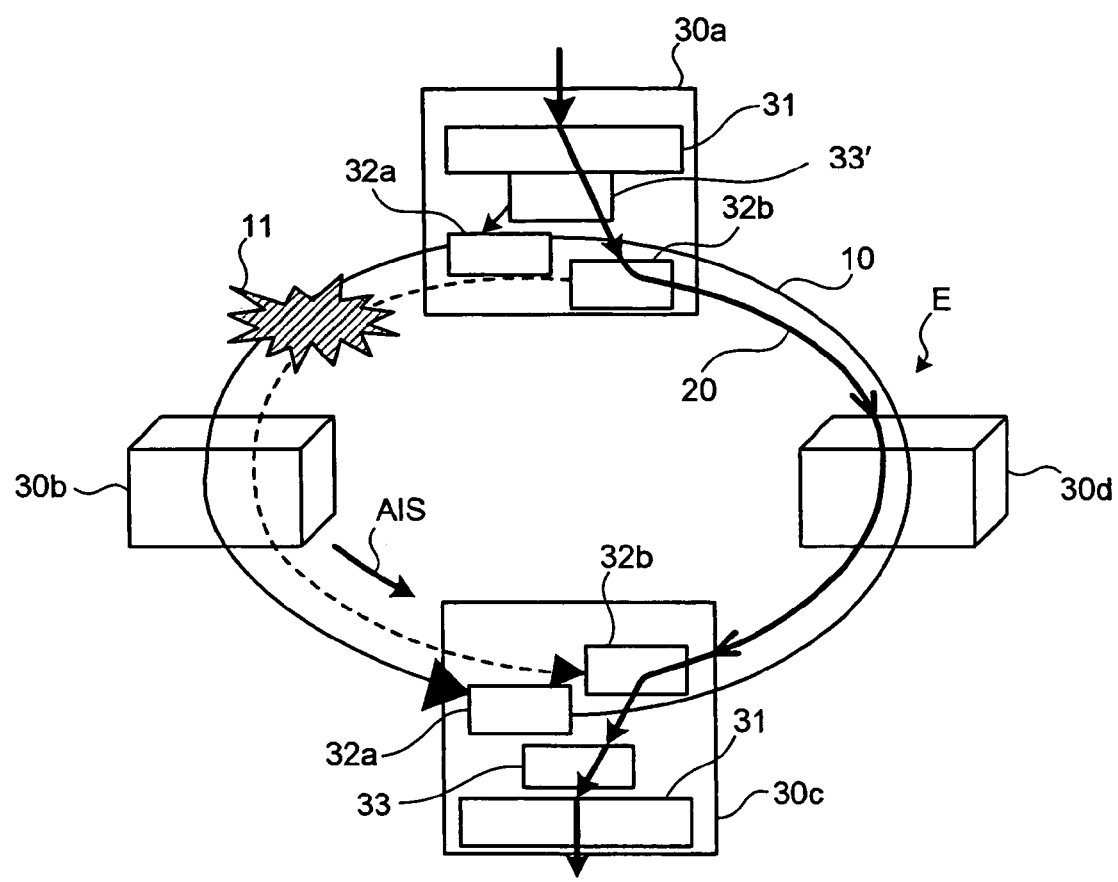
FIG. 9D is a diagram of a recovery operation from a failure in the OUPSR system.
Figure 10A:
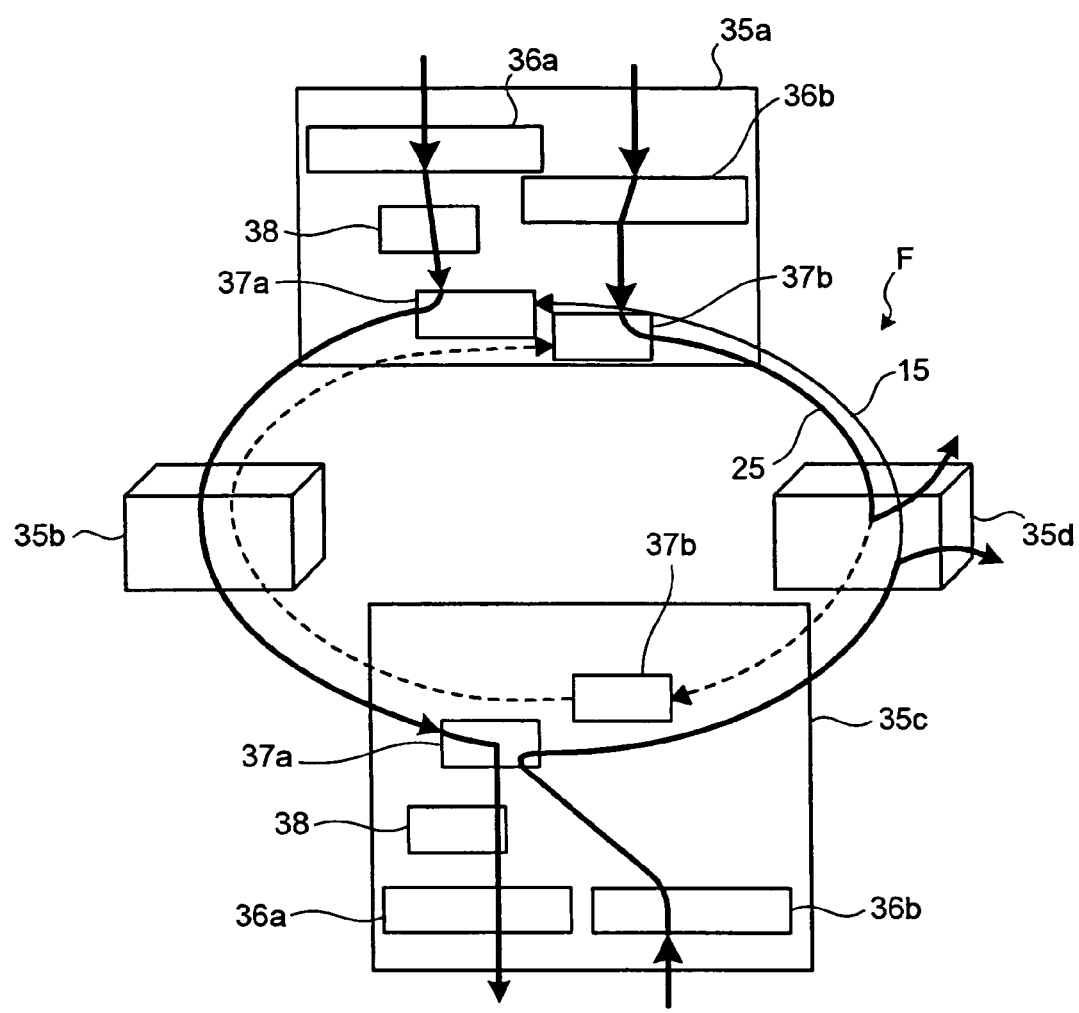
FIG. 10A is a diagram of a ring network in a conventional Optical Shared Path Protection Ring (OSPPR) system.
Figure 10B:
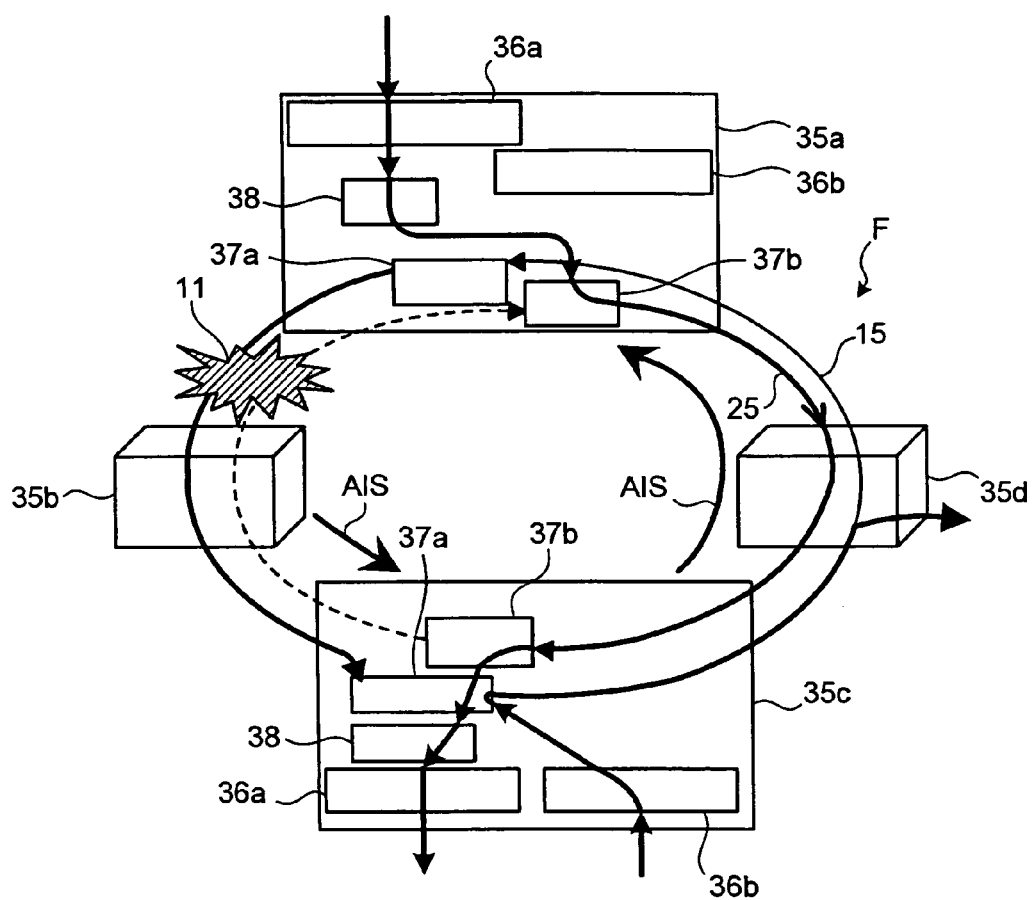
FIG. 10B is a diagram of a recovery operation from a failure in the OSPPR system.
Figure 11:
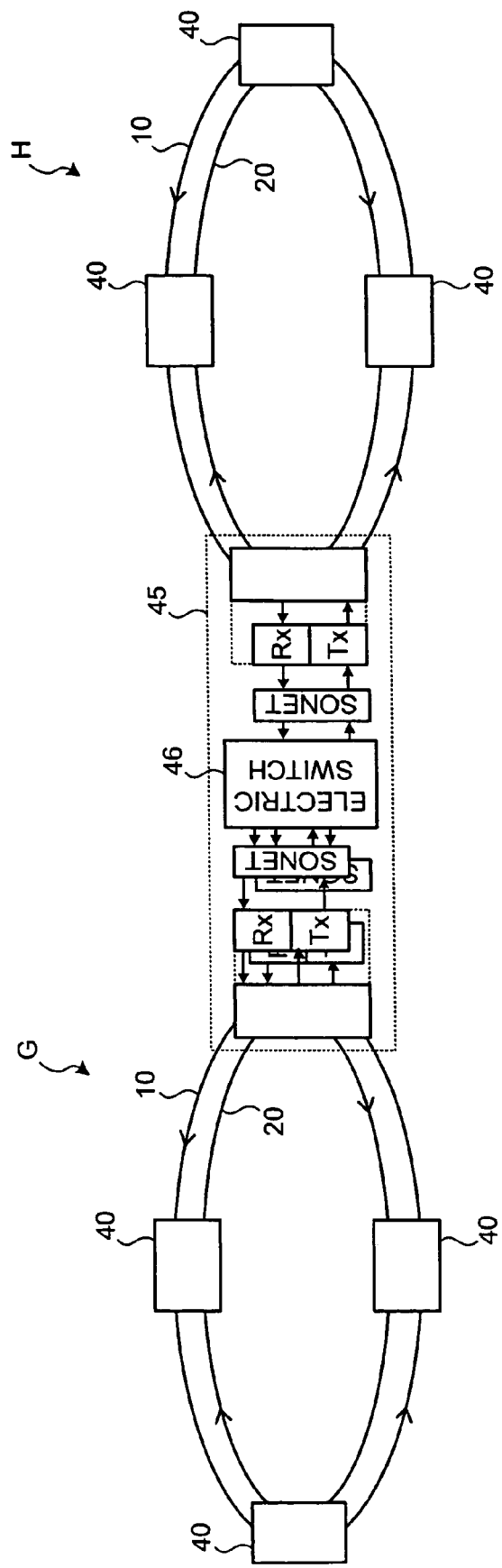
FIG. 11 is a diagram of a plurality of ring networks in which an optical signal is converted to an electric signal.
Figure 12A:
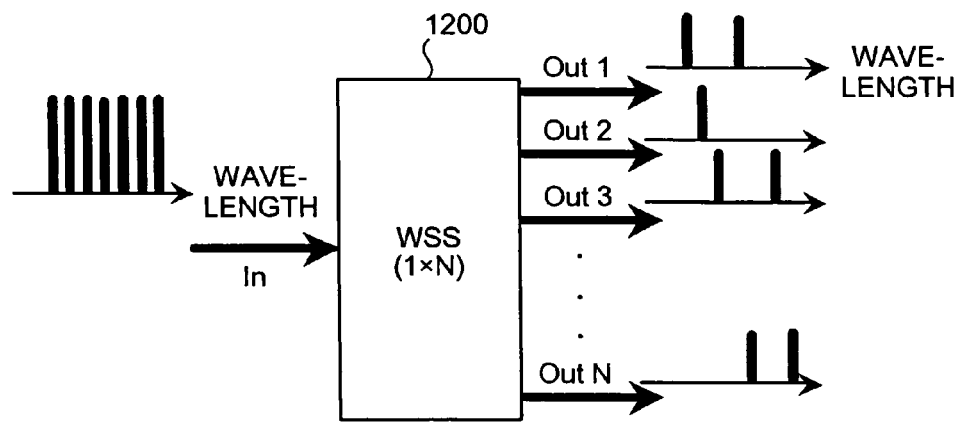
FIGS. 12A and 12B are diagrams of a function of a wavelength-selective switch (WSS)
Figure 12B:
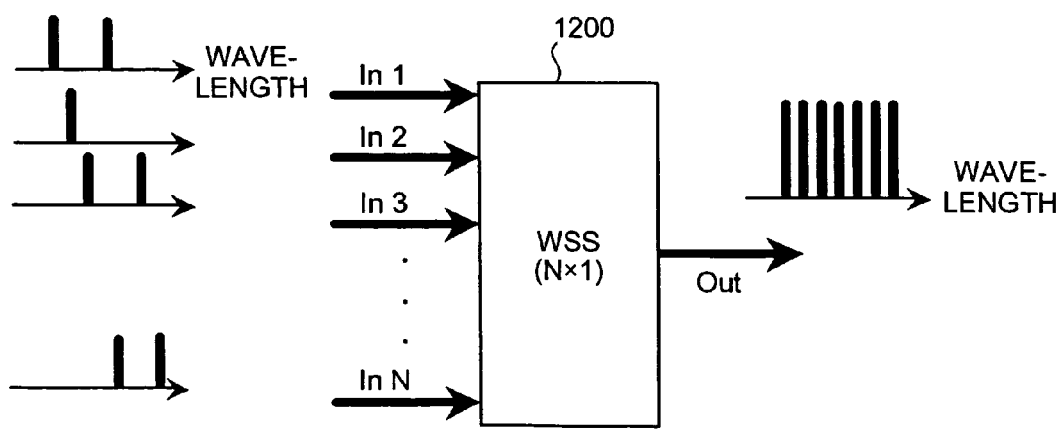
Figure 12C:
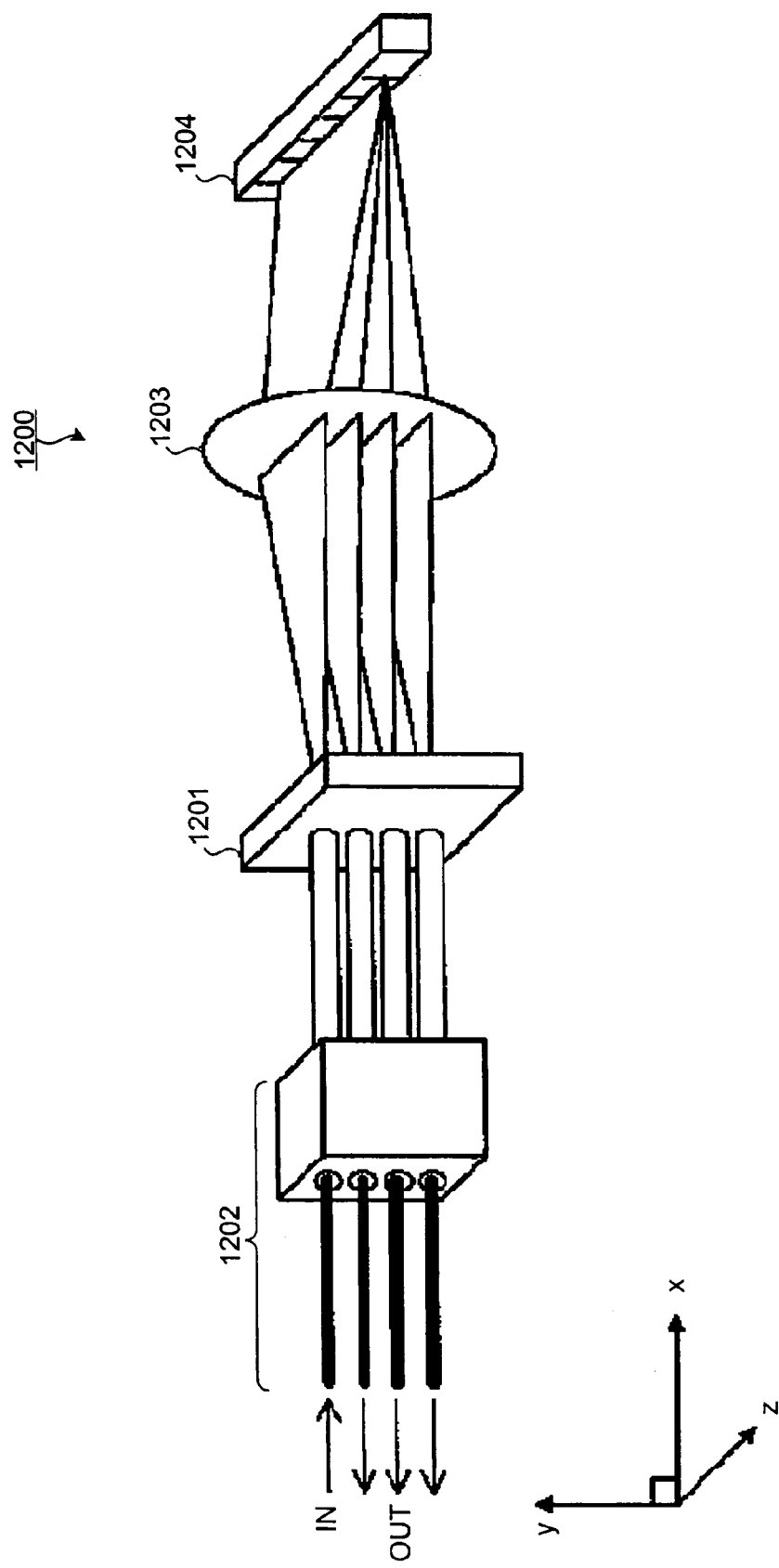
FIG. 12C is a perspective view of the WSS.
Figure 12D:
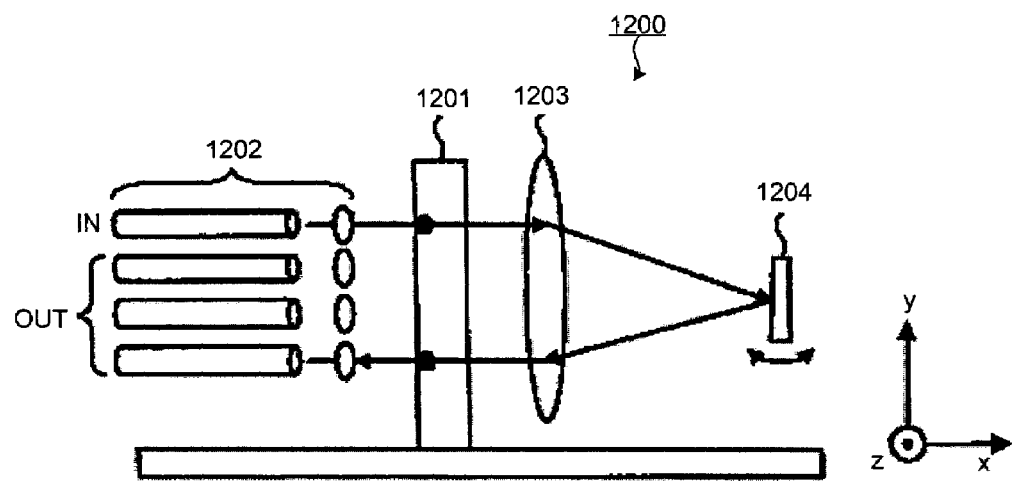
FIGS. 12D and 12E are side views of the WSS.
Figure 12E:
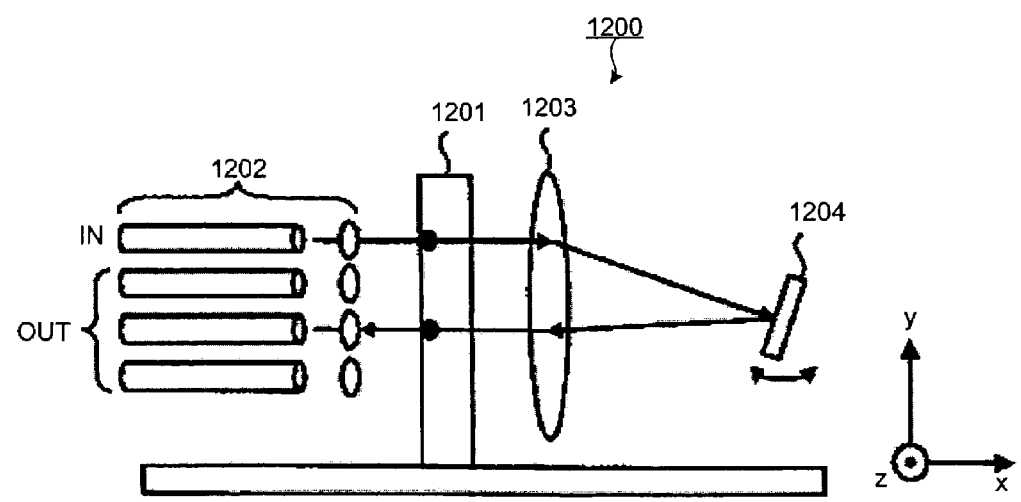

FIG. 8 is a diagram of an optical node with a wavelength-conversion function. An OXC SW 800 of the optical node includes input-side WSSs (1×3), output-side WSSs (4×1), and a wavelength converter 803 between the input-side WSSs and the output-side WSSs. The wavelength converter 803 includes optical branching filters (demultiplexers: DEMUX) 804, tunable transponders (Tu-TRP) 805, wavelength non-depending wave couplers (multiplexers: MUX) 806, and 1×2 WSSs 807. One of three output ports of each input-side WSS is connected to the wavelength converter 803. Two output ports of the wavelength converter 803 is selectively connected to either one of output-side WSSs connected to the ring network C or D.

When the number of ring networks to be connected is N, the input-side WSS includes 1 input port and (N+1) output ports (1×(N+1)), and the output-side WSS includes (N+1) input ports and 1 output port ((N+1)×1). The DEMUX 804 is a WSS, an array waveguide grading, or the like. The MUX 806 is a WSS, an optical coupler, or the like.

An input-side WSS 801 with three output ports branches a signal to be wavelength-converted and transmits the branched signal to the Tu-TRP 805 through one of the output ports. The Tu-TRP 805 converts the wavelength of the optical signal, and the converted signal is input to any one of the output-side WSSs via the MUX 806. When an output-side WSS 802 is selected, the converted signal is added to the signals to be transmitted to the ring network C.

The optical node with wavelength-conversion function described above can prevent network congestion and increase wavelength utilization efficiency. Such a wavelength-conversion function can be added to the optical node and the optical add/drop multiplexer according to both of the first and the second embodiments.

In the first and second embodiments, the networks connected by the optical node/the optical add/drop multiplexer are ring networks. However, the optical node/the optical add/drop multiplexer can connect a plurality of mesh networks since a mesh network can be regarded as a collection of a plurality of ring networks.

As explained above, according to the present invention, ring networks can be connected to each other by the optical node/the optical add/drop multiplexer that relays an optical signal as it is, while the conventional protection systems, such as the OSPPR system and the OUPSR system, can be adopted at they are.

According to the present invention, highly-reliable communication can be ensured even when a failure occurs in a network.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An optical node that is connected to a first network and a second network, the first network including a first transmission path and a second transmission path, the first transmission path and the second transmission path propagates light with reverse directions, the second network including a third transmission path and a fourth transmission path, the third transmission path and the fourth transmission path propagates light with reverse directions, comprising:
    a switching unit configured to selectively switch a plurality of optical signals propagating in the first transmission path and a plurality of optical signals propagating in the second transmission path to the third transmission path and the fourth transmission path, and to selectively switch a plurality of optical signals propagating in the third transmission path and a plurality of optical signals propagating in the fourth transmission path to the first transmission path and the second transmission path;
    a failure detector that detects a failure in the first network; and
    a control unit that controls the switching unit, wherein,
    when the failure detector detects the failure in the first network and a connection failure occurs between a first node in the first network and a second node in the second network utilizing the second transmission path and the fourth transmission path, the control unit controls the switching unit so that the first node and the second node are connected utilizing the first transmission path and the fourth transmission path.

2. The optical node according to claim 1, wherein the control unit causes the switching unit to connect the second transmission path of the network to the first transmission paths of the other (N−1) networks when the failure is detected.

3. The optical node according to claim 1, wherein the switching unit includes
    a plurality of first wavelength-selective switches each of which has an input port and a plurality of output ports; and
    a plurality of second wavelength-selective switches each of which has a plurality of input ports and an output port, wherein
    each of the first wavelength-selective switches are connected to any one of the second wavelength-selective switches.

4. The optical node according to claim 3, wherein each of the first wavelength-selective switches includes an input port and (2N−1) output ports, and each of the second wavelength-selective switches includes (2N−1) input ports and an output port.

5. The optical node according to claim 1, further comprising a failure notifier that notifies the failure to a downstream network of the N networks.

6. The optical node according to claim 1, further comprising a converter that converts wavelength of an optical signal transmitted over the N networks.

7. The optical node according to claim 1, wherein the connection of transmission paths is changed depending on priorities of previous communications.

8. An optical node that accommodates at least a first ring network and a second ring network, the first ring network including a first transmission path and a second transmission path, the second ring network including a third transmission path and a fourth transmission path, comprising:
    a first switch is optically connected to the first ring network and the second ring network; and
    a second switch configured to selectively switch a plurality of wavelengths of optical signals propagating in the second transmission path to the fourth transmission path, and to selectively switch a plurality of wavelengths of optical signals propagating in the fourth transmission path to the second transmission path.

9. The optical node according to claim 8, wherein the first switch and the second switch respectively includes
    a plurality of first wavelength-selective switches each of which has an input port and a plurality of output ports; and
    a plurality of second wavelength-selective switches each of which has a plurality of input ports and an output port, wherein
    each of the first wavelength-selective switches are connected to any one of the second wavelength-selective switches.

10. The optical node according to claim 9, wherein each of the first wavelength-selective switches includes an input port and N output ports, and each of the second wavelength-selective switches includes N input ports and an output port.

11. The optical node according to claim 8, further comprising a converter that converts wavelength of an optical signal transmitted over the first and second ring networks.

* * * * *